(12) United States Patent
Gilliland et al.

(10) Patent No.: US 10,955,532 B2
(45) Date of Patent: *Mar. 23, 2021

(54) MODULAR LADAR SENSOR

(71) Applicant: CONTINENTAL ADVANCED LIDAR SOLUTIONS US, LLC, Carpinteria, CA (US)

(72) Inventors: Patrick Gilliland, Santa Barbara, CA (US); Laurent Heughebaert, Santa Paula, CA (US); Joseph Spagnolia, Ventura, CA (US); Brad Short, Goleta, CA (US); Roger Stettner, Santa Barbara, CA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,697

(22) Filed: Apr. 10, 2019

(65) Prior Publication Data
US 2020/0025895 A1    Jan. 23, 2020

Related U.S. Application Data

(63) Continuation of application No. 15/720,310, filed on Sep. 29, 2017, now Pat. No. 10,557,926, which is a
(Continued)

(51) Int. Cl.
*G01S 7/4863* (2020.01)
*H04N 13/167* (2018.01)
(Continued)

(52) U.S. Cl.
CPC .......... *G01S 7/4863* (2013.01); *G01S 7/4813* (2013.01); *G01S 17/87* (2013.01); *G01S 17/89* (2013.01);
(Continued)

(58) Field of Classification Search
CPC .................................................. H04N 13/172
See application file for complete search history.

(56) References Cited

U.S. PATENT DOCUMENTS

| 632,482 A | 9/1899 | Van Der Vijgh |
|---|---|---|
| 5,629,524 A | 5/1997 | Stettner et al. |

(Continued)

FOREIGN PATENT DOCUMENTS

| JP | 2008-076390 | 4/2008 |
|---|---|---|
| JP | 2010-535334 A | 7/2008 |

(Continued)

OTHER PUBLICATIONS

Charlie Rumgay et al., Team Navy: Environmental Enclosure Project Statement of Work and Detailed Design Report, Mar. 18, 2010, State College, Pennsylvania.
(Continued)

*Primary Examiner* — Jefferey F Harold
*Assistant Examiner* — Justin B Sanders

(57) ABSTRACT

A lightweight, inexpensive LADAR sensor incorporating 3-D focal plane arrays is adapted specifically for modular manufacture and rapid field configurability and provisioning. The sensor generates, at high speed, 3-D image maps and object data at short to medium ranges. The techniques and structures described may be used to extend the range of long range systems as well, though the focus is on compact, short to medium range ladar sensors suitable for use in multi-sensor television production systems and 3-D graphics capture and moviemaking. 3-D focal plane arrays are used in a variety of physical configurations to provide useful new capabilities.

20 Claims, 14 Drawing Sheets

Related U.S. Application Data continuation of application No. 15/228,428, filed on Aug. 4, 2016, now Pat. No. 9,797,995, which is a continuation of application No. 15/010,915, filed on Jan. 29, 2016, now Pat. No. 9,420,264, which is a continuation of application No. 13/747,671, filed on Jan. 23, 2013, now Pat. No. 9,277,204.

(51) Int. Cl.
| | |
|---|---|
| *H04N 13/172* | (2018.01) |
| *H04N 13/25* | (2018.01) |
| *G01S 17/89* | (2020.01) |
| *G01S 7/481* | (2006.01) |
| *G01S 17/931* | (2020.01) |
| *G01S 17/87* | (2020.01) |

(52) U.S. Cl.
CPC ......... *G01S 17/931* (2020.01); *H04N 13/167* (2018.05); *H04N 13/172* (2018.05); *H04N 13/25* (2018.05)

(56) References Cited

U.S. PATENT DOCUMENTS

| | | |
|---|---|---|
| 5,696,577 A | 12/1997 | Stettner et al. |
| 5,892,575 A | 4/1999 | Marino |
| 6,133,989 A | 10/2000 | Stettner et al. |
| 6,414,746 B1 | 7/2002 | Stettner et al. |
| 2004/0004707 A1 | 1/2004 | DeFlumere |
| 2004/0021852 A1 | 2/2004 | DeFlumere |
| 2005/0195383 A1 | 9/2005 | Breed et al. |
| 2009/0237640 A1 | 9/2009 | Gubala et al. |
| 2010/0309288 A1 | 12/2010 | Stettner et al. |
| 2011/0096427 A1 | 4/2011 | Rawlings et al. |
| 2014/0049616 A1 | 2/2014 | Stettner |

FOREIGN PATENT DOCUMENTS

| | | |
|---|---|---|
| JP | 2011-117849 | 6/2011 |
| WO | 2003067276 | 2/2003 |

OTHER PUBLICATIONS

Translation of Japanese Office Action for related application No. 2018-017979, dated Feb. 26, 2019.

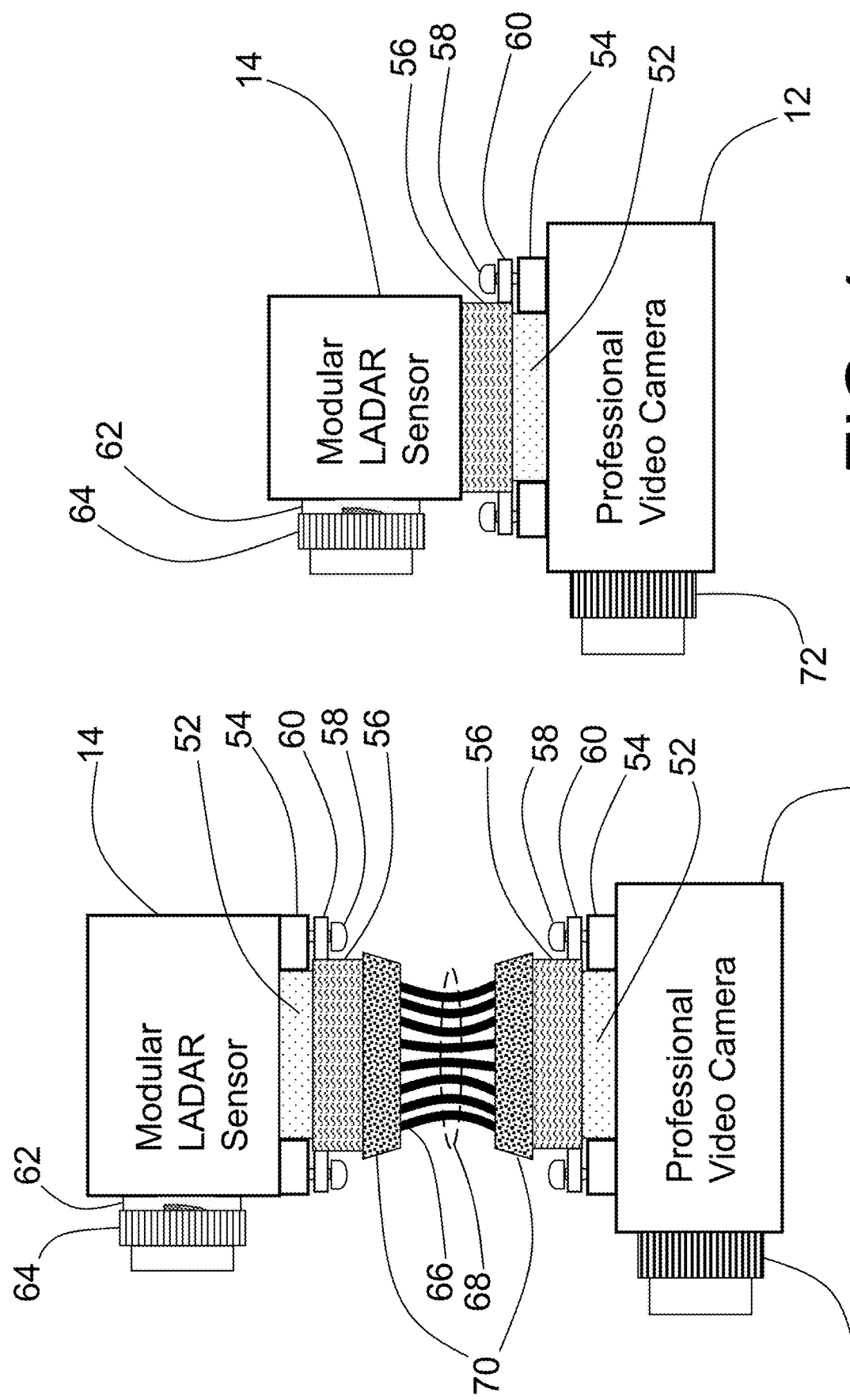

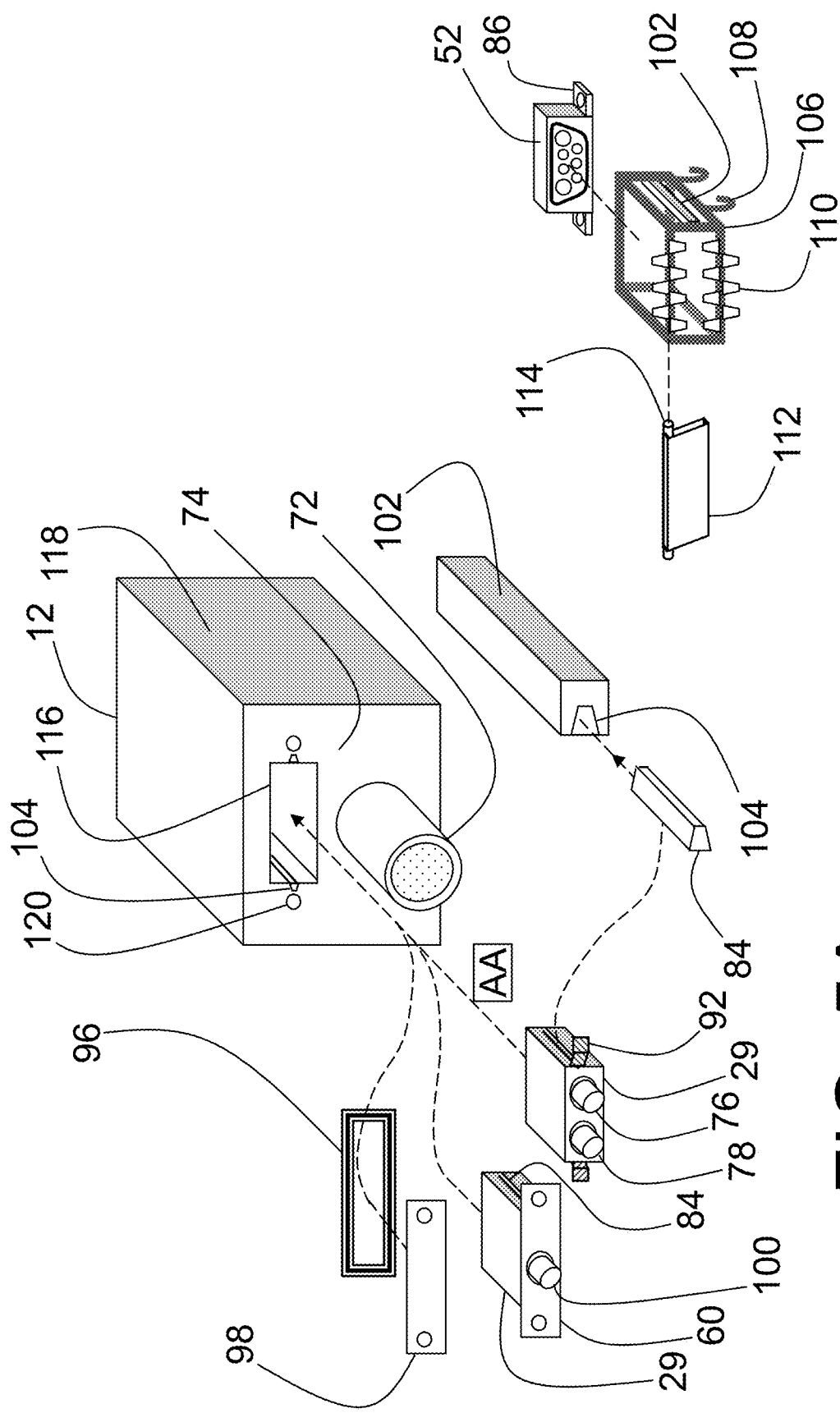

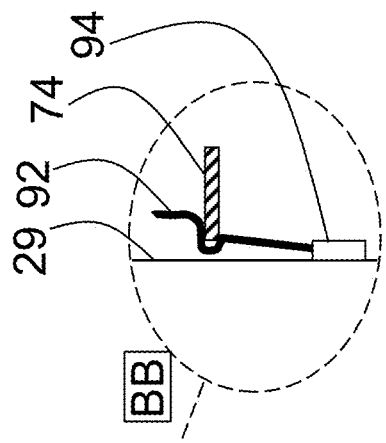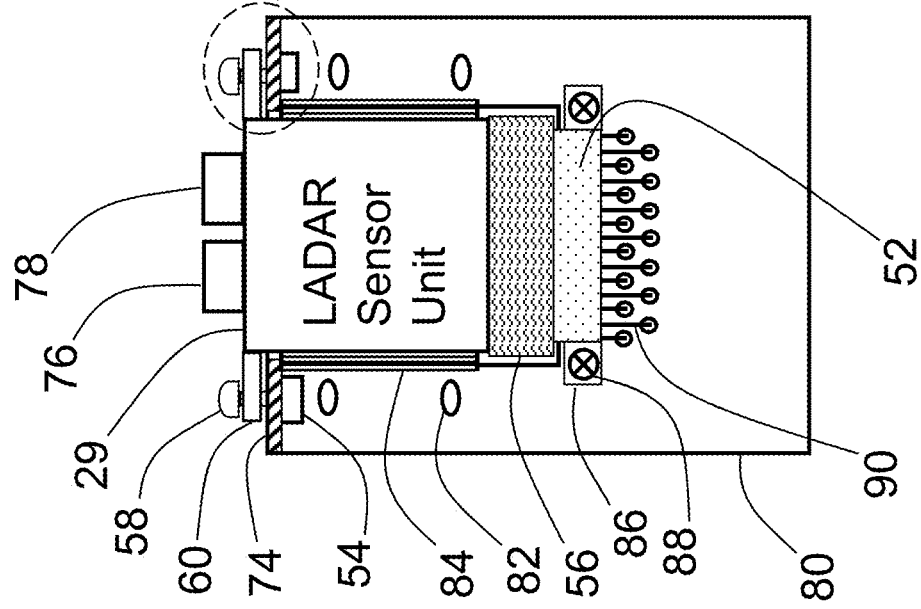

MODULAR LADAR SENSOR

CROSS REFERENCE TO RELATED APPLICATIONS

This application is a continuation of prior application Ser. No. 15/720,310, filed Sep. 29, 2017, which is a continuation of prior application Ser. No. 15/228,428, filed Aug. 4, 2016, which is a continuation of prior application Ser. No. 15/010,915, filed Jan. 29, 2016, which is a continuation of prior application Ser. No. 13/747,671, filed Jan. 23, 2013.

TECHNICAL FIELD

The embodiments disclosed herein relate generally to 3-D image generation and recording and more particularly to systems which may synthesize 3-D solid object models from data supplied by multiple optical sensors. Many systems have been proposed to meet the challenge of using video cameras in a production system to create 3-D maps of scenes and models of solid objects. Stereo systems, holographic capture systems, and those which acquire shape from motion, have all been proposed and in some cases demonstrated, but what is lacking is a system with the capability of producing a full 360 degree solid object model without a time consuming set up, and operating conditions which result in restrictions on the actors, set, scene, athlete, or object in play.

BACKGROUND

The 3-D imaging technology disclosed in Stettner et al, U.S. Pat. Nos. 5,446,529, 6,133,989 and 6,414,746 provides with a single pulse of light, typically pulsed laser light, all the information of a conventional 2-D picture along with the third dimensional coordinates; it furnishes the 3-D coordinates of everything in its field of view. This use is typically referred to as flash 3-D imaging in analogy with ordinary digital 2-D cameras using flash attachments for a self contained source of light. As with ordinary 2-D digital cameras, the light is focused by a lens on the focal plane of the LADAR sensor, which contains an array of pixels called a focal plane array (FPA). In the case of a LADAR sensor these pixels are "smart" and can collect data which enables a processor to calculate the round-trip time of flight of the laser pulse to reflective features on the object of interest. Each smart pixel also collects data associated with the returning laser pulse shape and magnitude. The work of Stern and Cole, "High-sensitivity, wide-dynamic-range avalanche photodiode pixel design for large-scale imaging arrays", appearing in the Journal of Electronic Imaging 19(2), 021102 (April-June 2010), is referenced for design features and fabrication techniques which may improve the efficiency and isolation of the elements of the focal plane detector arrays common to the several designs described herein.

One value of these flash LADAR sensors, as opposed to competing designs in which one or more pixels is scanned over the field of view, is the elimination of the precision mechanical scanner, which is costly, high maintenance and typically large and heavy. The pixels in the focal plane of a flash LADAR sensor are automatically registered due to their permanent positions within the array. Further, by capturing a frame of data as opposed to one or a few pixels with one laser pulse, the data rate is greatly increased while weight and volume are reduced. Because each frame of data is captured from the reflection of a short duration laser pulse, moving objects or surfaces of stationary objects may be captured from a moving platform without blurring or distortion.

It is therefore desirable to provide a device to generate 3D data which is both low cost and flexible in manufacture due in part to the modular nature of the design. It is also an object of the invention to provide a modular ladar sensor unit as a component which may be utilized ubiquitously in any application by any imaging platform, computer, or host device provided with a number of basic electrical and mechanical interfaces. It is a further object of the invention to provide a flash ladar sensor component to a 3-D video production system which is both flexible and rapidly reconfigurable, allowing it to be adapted to any field of play, theater, arena or surveillance sector.

BRIEF SUMMARY

A modular ladar sensor employs a receiver module within housing. The housing incorporates a quick connect optical receptacle coupler and has a laser transmitter electrical connector and a laser transmitter mechanical mount for rapidly mounting a laser transmitter module. A lens assembly with a quick connect optical plug coupler mates with the optical receptacle coupler. A laser transmitter module with an electrical connector is adapted to engage and mate with the laser transmitter electrical connector, and with complementary mechanical mounting and fastening features mates with the laser transmitter mechanical mount. The laser transmitter has a modulated laser light output and a diffusing optic for illuminating a scene in the field of view of the modular ladar sensor. A two dimensional array of light sensitive detectors is positioned at a focal plane of the lens assembly, each of the light sensitive detectors with an output producing an electrical response signal from a reflected portion of the modulated laser light output. A readout integrated circuit with multiple unit cell electrical circuits, each of the unit cell electrical circuits having an input connected to one of the light sensitive detector outputs, and each unit cell electrical circuit having an electrical response signal demodulator and a range measuring circuit connected to an output of the electrical response signal demodulator, is connected to a reference signal providing a zero range reference for the range measuring circuit. A detector bias circuit is connected to at least one voltage distribution grid of the array of light sensitive detectors and a temperature stabilized frequency.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 3 shows a first type of a modular ladar sensor suitable for fast and easy external connection to field equipment through a cable adaptor; in this case a personal or professional video camera;

FIG. 4 shows a second type of a modular ladar sensor suitable for fast and easy external connection to field equipment through a quick mount electrical and mechanical connector; the equipment in this case being a personal or professional video camera;

FIGS. 5 A, 5B, 5C, and 5D show an exploded view, top view, clip detail and slot detail, respectively, of a modular ladar sensor unit for internal mounting within a chassis and details features of the module for mating, retention within the chassis, and suppression of radiating electromagnetic fields;

DETAILED DESCRIPTION

Figure 1:
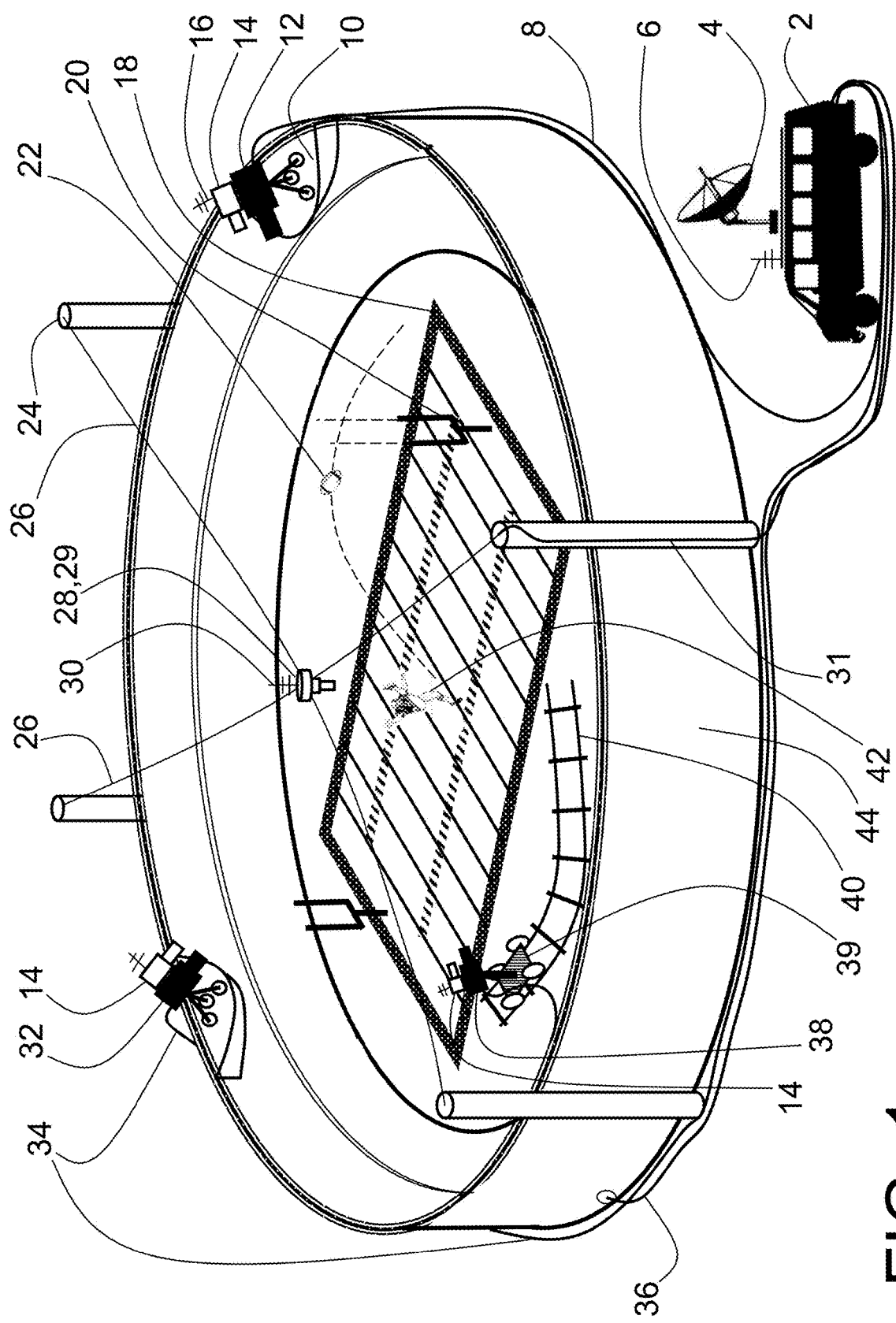
FIG. 1 is a diagram of a typical application of the present invention adapted for rapidly mounting to a production video camera for broadcasting a sporting event, and the use of multiple cameras and sensors to produce a composite 3-D image.

This application contains new subject matter related to previous U.S. Pat. Nos. 5,696,577, 6,133,989, 5,629,524, 6,414,746, 6,362,482, D463,383, and U.S. patent application Ser. No. 10/066,340 filed on Jan. 31, 2002 and published as US 2002/0117340 A1, the disclosures of which are incorporated herein by reference.

The embodiments disclosed herein provide a device for 3-D imaging using a modular ladar sensor with a field of view and a wavelength of operation comprised of several components, wherein each of the key components of the ladar sensor is a self contained sub-assembly, easily assembled together to produce a functional ladar sensor. Each of the modules, or sub-assemblies, has both mechanical and electrical interfaces well suited to modular assembly. The modular ladar sensor may also have an optical interface and connector. The modular ladar sensor is well adapted externally to be rapidly mounted to any equipment having a proper set of external mechanical, electrical, and optical interfaces. The modular ladar sensor has an illuminating laser module which may incorporate a semiconductor laser with a modulated laser light output, or a giant pulse solid state laser, and a diffusing optic for illuminating a scene in the field of view of the modular ladar sensor. The modular ladar sensor also comprises a receiver module featuring a two dimensional array of light sensitive detectors positioned at a focal plane of a light collecting and focusing assembly. The light collecting and focusing assembly may also be modular, with a quick-connect mechanical interface. Each of the light sensitive detectors has an output producing an electrical response signal from a reflected portion of the laser light output. The electrical response signals are connected to a readout integrated circuit with a corresponding array of unit cell electrical circuits. Each of the unit cell electrical circuits has an input connected to one of the light sensitive detector outputs, an electrical response signal demodulator, and a range measuring circuit connected to an output of the electrical response signal demodulator. The demodulator may be a voltage sampler and analog shift register for storing sequential samples of the electrical response signals, or it may comprise a mixer, integrator, or matched filter. The demodulation may also take place external to the readout integrated circuit, by a fast digital processor operating on a sequence of digitized samples from each pixel. The fast digital processor may employ algorithms which utilize weighted sums of sequential analog samples, or use fast Fourier transforms, convolution, integration, differentiation, curve fitting, or other digital processes on the digitized analog samples of the electrical response signals. The unit cell may also incorporate a trigger circuit, set to produce an output response when the output of the demodulator exceeds a preset threshold. The range measuring circuit is further connected to a reference signal providing a zero range reference for the modulated laser light output. The modular ladar sensor further incorporates a detector bias circuit connected to a voltage distribution grid of the detector array and a temperature stabilized frequency reference.

As will be shown and described with respect to the drawings, the instant invention is modular in two respects; first in the assembly of the ladar sensor component sub-assemblies, and second in the ubiquitous manner which the quick connect interfaces provide 3-D image sensing to any host platform having the mating interfaces. The present invention is a compact modular ladar sensor embodied in a modular assembly of a laser transmitter, optics sub-assembly, and camera body with internal receiver module. The modular ladar sensor is provided with an external quick connect mechanical and electrical interface for rapid mounting and de-mounting to a host platform, thus providing 3-D sensing capability to any host platform having the complementary electrical and mechanical quick connect interfaces. In some cases, the modular ladar sensor is adapted to plug into a quick connect mechanical and electrical interface mounted on an outside surface of the host platform. In other cases, the modular ladar sensor is adapted to plug into a quick connect mechanical and electrical interface mounted inside a surface of the host platform. In some instances, the quick connect mechanical and electrical interface includes a fiber optic connector. In a further development, the modular ladar sensor is realized as a compact ladar sensor unit, streamlined to facilitate plugging and unplugging of the unit onto the surface of a host equipment, or into a recess of a host equipment.

The modular ladar sensor may include a system control processor with frequency reference and inertial reference, a system memory, a pulsed laser transmitter, transmit optics, receive optics, an array of light detecting elements positioned at a focal plane of the receive optics, a detector bias converter for supplying bias voltage to the light detecting focal plane array, a readout integrated circuit, analog-to-digital converter circuits for producing digital image data from the analog readout IC outputs, a data reduction processor for adjusting and correcting the image data, and an object tracking processor for identifying and tracking features and objects in the corrected image database. When used with feedback and control mechanisms, a tracking 3-D video production of moving objects is enabled, and in a wide array of other mobile equipment, collision avoidance, scene capture, guidance, and navigation is enabled.

Each pixel in a 3D focal plane array (FPA) converts impinging laser light into an electronic signal whose magnitude is sampled in time and stored in memory within the pixel. Each pixel also uses a clock to time the samples being taken in response to the captured reflection of the laser light from a target surface. Different embodiments may include bayonet mounted receiving optics, a special purpose reduced instruction set computing (RISC) processor, an array of vertical cavity surface emitting lasers, an array of laser diodes, or an optically pumped solid state laser, and an FPA of light detecting elements formed on a silicon-on-sapphire (SOS) or gallium nitride on sapphire substrate (GNOS), and the light detecting elements may be avalanche photodiodes (APDs), PIN diodes, or NIP diodes. The modular ladar sensor may also have special provisions for reducing the EMI radiated from a host platform chassis which has an opening adapted to accept an internally pluggable modular ladar sensor of the type described herein. There may be an EMI gasket, a spring loaded door, and spring fingers mounted to an open cage structure similar to the GBIC cage described in design patent D463,383. The cage structure may have integrally molded guide rails and "J" hooks for connecting to a host platform printed circuit board or enclosure panel. The cage structure may also mount an electrical/optical connector at a rear opening, or the electrical/optical connector may be mounted to a PC board of the host platform in a preferred embodiment. The modular ladar sensor typically incorporates a hybrid assembly of focal plane array and readout integrated circuit, and the readout IC is arranged as an array of unit cell electrical circuits, and each unit cell is arranged to be in an array of identical spacing and order as the mating focal plane array.

The unit cells of the modular ladar sensor may also make use of a matched filter incorporating a parametric analog correlator, and may use chirped transmissions or multi-pulse transmission codes such as Barker codes, to deal with multipath reflections from objects or features in the field of view of the modular ladar sensor, and to produce processing gains. The modular ladar sensor may also make use of pulsed CW transmissions and heterodyne detection to enhance range performance as described in the reference material. The modular ladar sensor is well adapted by a variety of innovative features and structures to be manufactured efficiently and rapidly deployed in the field by external or internal recessed pluggable mounting to any electronic host platform having the requisite electrical, mechanical, and optical interfaces. The modular ladar sensor is specifically adapted to a lightweight, low volume, low cost design, which provides new capabilities when applied to a variety of imaging applications. The modular ladar sensor in a first embodiment is capable of working in a flash mode as described above, or in a multi-pulse mode, or in a pulsed continuous-wave mode as the situation dictates.

The production system incorporating the modular ladar system has a number of features which enable full 3D object modeling and tracking, as well as scene enhancements derived from the merging of 2D and 3D data bases and managing of both 3D and conventional 2D video cameras. The production system also has the ability to null differences in length between the various connecting cables of the deployed system, whether optical or electrical, and the ability to self-locate globally a mobile production van or edit bay, as well as the ability to project a local coordinate system wirelessly to the various cameras deployed in a particular venue.

The first embodiment of the modular ladar sensor includes a "D" connector plug having electrical connecting pins and a metal shell and flange with retained jackscrews for attaching to a host platform. An array of vertical cavity surface emitting lasers provides pulsed illuminating energy to a scene in the field of view at an eye-safe wavelength. The first embodiment provides a 128×128 array of light detecting elements situated on a single insulating sapphire substrate which is stacked atop a readout integrated circuit using a hybrid assembly method. In other embodiments of the design, M×N focal plane arrays of light detecting elements with M and N having values from 2 to 1024 and greater are anticipated.

The compact design using modular receive optics and laser transmitter sub-assemblies with highly efficient surface emitting semiconductor lasers, creates an opportunity to incorporate 3-D ladar imaging capability into a variety of portable and professional electronic equipment, including video cameras, robotic crawlers, automobiles, trucks, airplanes, boats, portable computers, and a variety of imaging instruments. Other applications can be envisioned for such a compact and cost effective design as is described herein in the preferred and alternative embodiments, and a more exhaustive list is presented in succeeding paragraphs.

A first embodiment of the modular ladar production system, is depicted in isometric drawing form in FIG. 1. A production van 2 controls the functions of the major components of the production video system. Production van 2 receives global positioning coordinates and time references from GPS satellites and transmits video via receiving and transmitting antenna 4 mounted to the top of the production van or truck 2. A local positioning coordinate system uses local antenna 6 to transmit local positioning references and may receive responses from other camera antennas 16, 30 mounted to modular ladar sensors 14 or to the host video camera platform. Production van 2 also connects to a professional video camera 12 through bidirectional fiber optic transmission link over fiber optic cable 8. Professional video camera 12 is mounted to a wheeled dolly and rests on a dedicated platform 10 projecting from stadium or arena structure 44. Modular ladar sensor 14 is mounted externally to professional video camera 12 through a "D" type electrical connector and secured with jackscrews as shown in the detail of FIG. 4. A GPS receiving antenna 16 may be mounted to video camera 12 or modular ladar sensor 14, and receives position and time reference data from satellites or other local references such as production van 2. The GPS receiving antenna 16 may also be used to transmit camera status or video signals back to production van 2 if suitable fiber optic or electrical cable connections are unavailable. Professional video camera 12 and modular ladar sensor 14 are typically set up to view at minimum the entire playing surface of the field within the boundary lines 18, but may have a wider or narrower field of view depending upon the number and type of cameras employed in the production. Of primary importance, professional video camera 12 and modular ladar sensor 14 are set up with a clear view of a regular feature 20, in this case a goalpost, which may in general be any feature of the field or stage of the scene, such as a end zone flag or pylon, home plate, pitcher's mound, blue line in hockey, net of a tennis court, actor's marks, set, scene, or backdrop features of a play or studio, or any other identifiable and stationary feature of the set, scene, court, or field of play. An object in play 22, in this case a football, travels within the field of play, court, stage, or set, and may be tracked by any of the professional video cameras 12, 28, 32, or 38. The stadium 44, arena, studio, or set, has a stanchion 24 or other vertical support member providing an overhead point of attachment for a plurality of traversing cables 26 which support SkyCam® 28, or other mobile overhead camera system 28, which also has embedded a modular ladar sensor unit 29 according to the drawings of FIG. 5A-D. The mobile overhead camera 28 also has an antenna 30 which may be used to transmit and receive GPS or local positioning reference data, camera status, and movement control commands from the production van 2. These signals may also be transferred bidirectionally over electrical cable or fiber optic link 31 which may be strung vertically along stanchion 24 and then along traversing cables 26 or embedded within traversing cables 26.

A second professional video camera 32 with modular ladar sensor 14 is mounted on a second platform at a far end of stadium 44 and communicates bidirectionally through fiber optic cable 34 to production van 2 and is mounted atop a wheeled dolly and is sited to cover the shadows or blind spots seen from the first professional video camera 12. A third fiber optic or electrical cable 36 connects a third field level professional video camera 38 with a third modular ladar sensor 14 and local antenna mounted thereto to production van 2. Third professional video camera 38 is mounted on a wheeled cart 39 which travels on a fixed track 40 in manner similar to a railroad car. All three professional video cameras may also used to track athlete/actor 42 as he/she travels from point to point in the field of play, set, stage, or court. The actor/athlete 42 may have a special feature such as a football helmet, hat, coat, shirt, shoes, or gloves attached which may have special infrared reflectors installed to enhance the tracking thereof. The applied reflectors increase the levels of the reflected light pulses from the athlete/actors 42 and objects in play 22, thus enhancing the accuracy of 3D range data, and making it easier to separate the actor/athletes 42 and objects in play 22 from the background, and thus make the tracking of these actor/athletes 42 and objects in motion 22 much easier. These infrared reflectors may be a decal or special reflective film applied to the athlete's helmet, and which are otherwise transparent to light except at the wavelength of interest, in this case 1.57 micron pulsed light emitted from the modular ladar sensors 14. Installation of these reflectors may also be effected on the object in play 22 to enhance detection and tracking of the object in play, which in the case of a baseball, hockey puck, or golfball, may be very difficult to track visually using only 2-D data. Any object in play 22 or special feature of an actor/athlete's 42 costume, uniform, or equipment may also be coated with a reflective film by placing the object in a physical vapor deposition (PVD) chamber and applying a series of coatings by evaporation, flame spray, sputtering, or gas decomposition. Use of the infrared reflector films or decals may allow for more effective ladar enabled tracking without altering the appearance of the actor/athletes 42 or objects in play 22, since the wavelength of interaction is beyond the visible spectrum. Use of multiple 2D professional video cameras 12, 28, 32, and 38 and modular ladar sensors 14, 29 provides a 3D vision system that allows for a complete color 3D model of the actor/athlete/performer 42, object in play 22, regular features 20, and field of play, set, stage, or court within a boundary 22 to be composed by a 3-D scene processor within production van 2. The individual professional video cameras may be commanded to point in any direction within their field of view by commands sent from production van 2, or may be set in a remote tracking mode, wherein the modular ladar sensor 14 output 3-D data is fed to the servo control motors of professional video camera 12, and the servo motors of professional video camera 12 controlling azimuth, elevation, and the zoom lens drive may be used to track and frame the object in motion 22, or actor/athlete/performer 42. The preferred embodiment of FIG. 1 has the modular ladar sensors 14 attached to professional video cameras 12 which produce conventional 2-D video, but the modular ladar sensors 14 may be operated independently of any 2-D video camera 12, instead mounted to or within a basic host platform consisting of a simple open frame computer, embedded computer, controller, or dedicated electronic circuits housed in a simple electronic enclosure.

Figure 2:
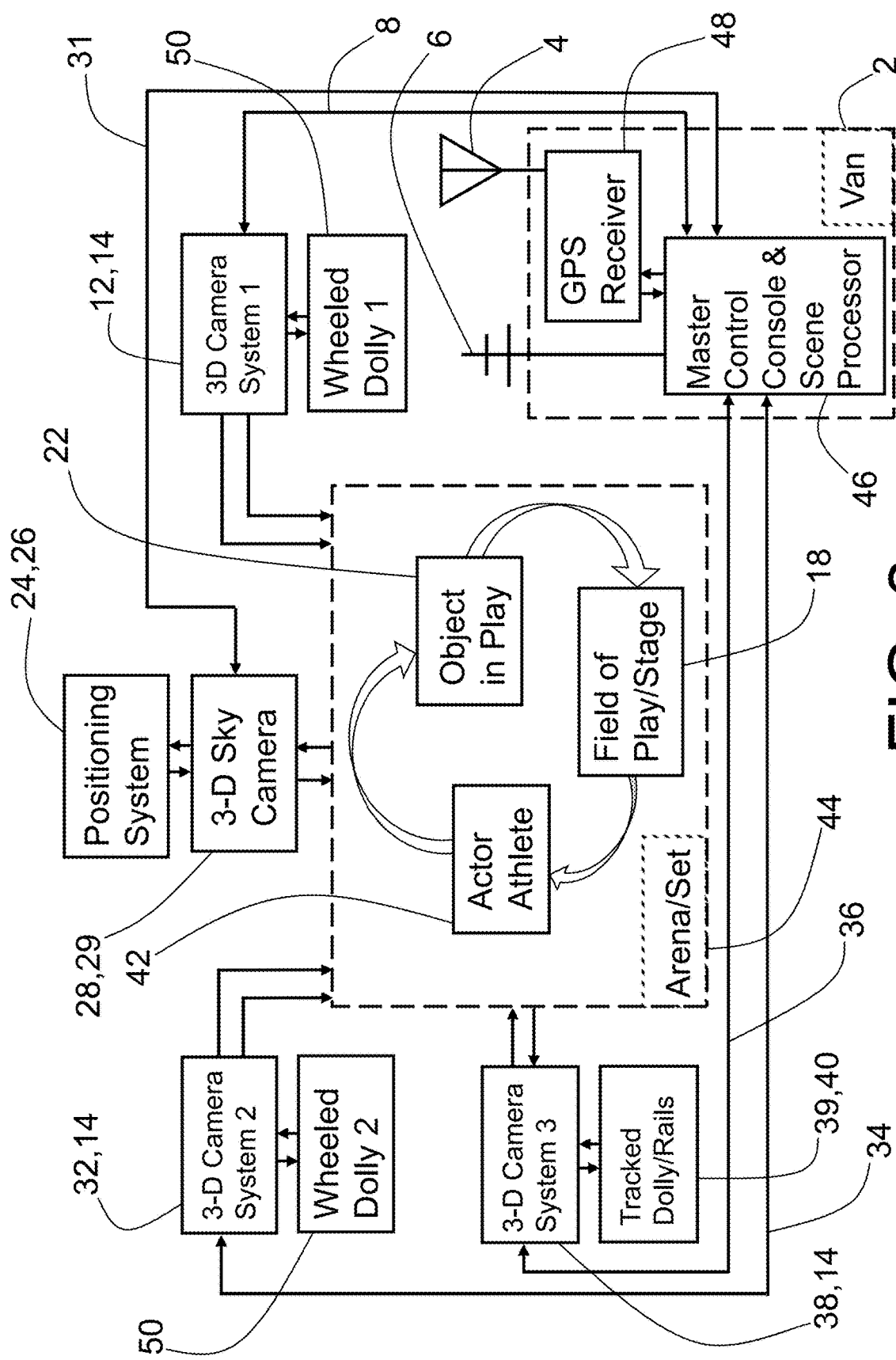
FIG. 2 is a system block diagram of a typical application as shown in FIG. 1 of the present invention of a modular ladar sensor of the type described herein.
Figures 9, 10:
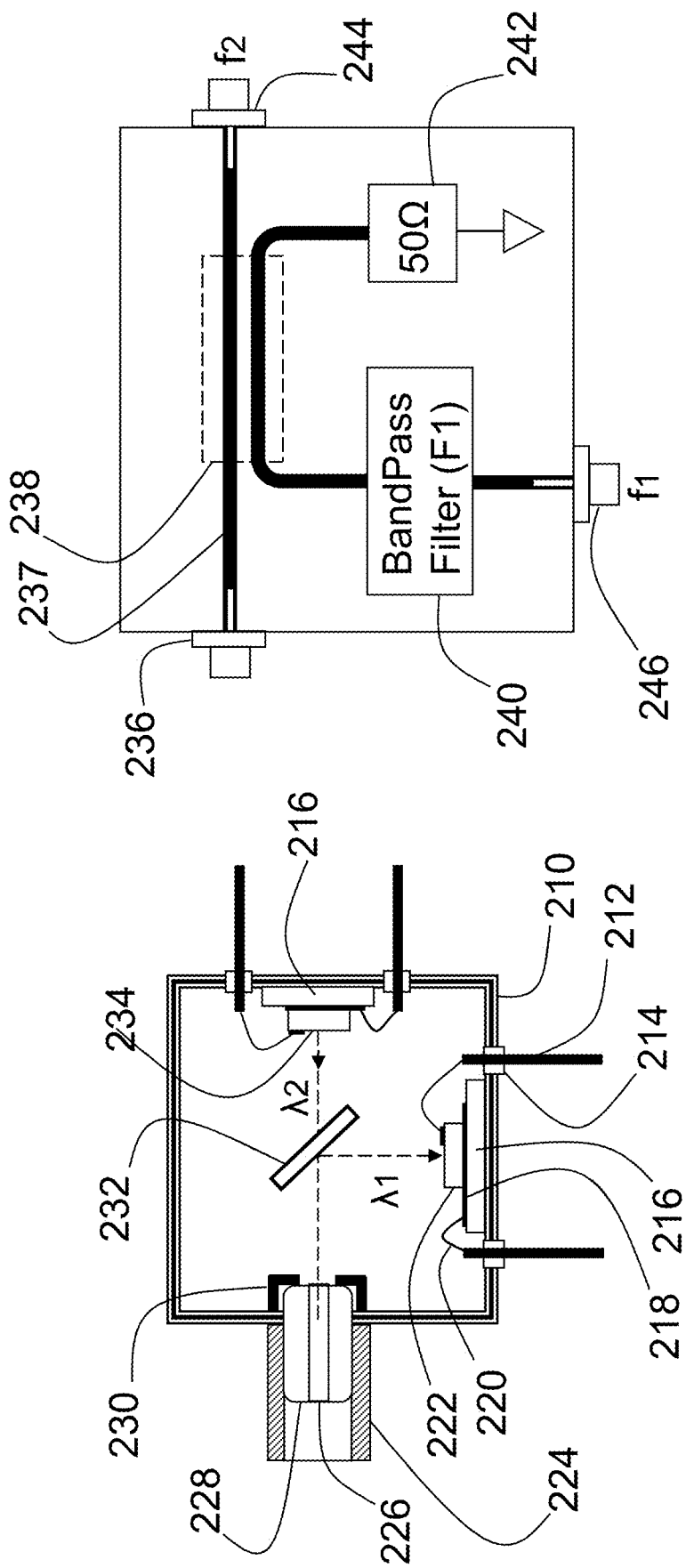
FIG. 9 is a diagram of the wavelength multiplexer component which may be used to equalize the interconnect delay of an optical cable in an application requiring the combination of several ladar sensors, and when precision timing is required.
FIG. 10 is a diagram of a frequency multiplexer component which may be used to equalize the interconnect delay of an electrical cable in an application requiring the combination of several ladar sensors, and when precision timing is required.

FIG. 2 is a block diagram of the installation of the modular ladar sensor production system shown in FIG. 1, and showing a number of additional features. Production van 2 has a master control console 46 which controls each of the cameras in the production suite, receives 2D and 3D video feeds from each camera system, and broadcasts local positioning data through local antenna 6, and may receive wireless signals in return from one or more of the professional video cameras 12, 28, 32, or 38. In the installation of FIG. 1, master control console 46 transmits commands to 3D camera system 1 made up of professional video camera 12 and modular ladar sensor 14 through fiber optic cable 8. 3D camera system 1 (12, 14) is mounted atop a first wheeled dolly 50. The pointing, focusing, and framing (zoom) of camera system 1 may be effected by a human operator, or may be done by servo motors controlled by a local digital controller residing on professional video camera 12. Inputs to the local controller residing on professional video camera 12 may come from master control console 46, or may come from modular ladar sensor 14 which may be tracking an athlete/actor/performer 42, object in play 22, or some identifiable feature 20 in the field of play 18, such as a goal post, net, pylon, or prop. Master control console 46 also receives camera status data and 2D and 3D video signals from 3D camera system 1 via fiber optic cable 8. Master control console 46 also has a scene processor, capable of accepting 3-D range and intensity files, as well as conventional 2-D video files and still pictures, from multiple sources simultaneously, and of using both the 3-D and 2-D data to compose and refine a solid model of an object of interest or scene in the common field of view of the multiple camera sources. Typical frame rates for 3D camera system 1 (12, 14) are in the range of 15-30 frames per second, allowing for time division multiplexing of transmit and receive signals over fiber optic cable 8. There is sufficient time between frames to transmit 2D and 3D data from 3D camera system 1 (12, 14) along with any requested camera status information, and to receive control commands from master control console 46. For example, if a 1 Mpixel camera were to use 24-bit color representation (R,G,B) and a 12-bit range and 8-bit infrared intensity representation, a typical uncompressed 3D frame would be on the order of 5.5 Mbytes. Only 44 Mbits/frame is required given this type of representation. Given a modest 1.25 Gigabit Ethernet connection, and a 20 Hz full frame rate video, then only 880 Mbits of the 1000 Mbit payload of the Gigabit Ethernet standard connection would be used, leaving plenty of time for an uplink containing camera commands to be sent. If a lossless compression is used on the 3D data frame, a 2:1 compression may be realized, enabling frame rates of up to 40 Hz, while still accommodating a camera control uplink signal from master control console 46. In the alternative, where frame rates must be higher, or image pixel counts greater, a wavelength division multiplexing scheme may be used to divide uplink and downlink, or to double or triple the number of downlinks if desired. The wavelength division multiplexing hardware is detailed in FIGS. 9 and 10. Of course, simply increasing transmission rates by moving to 2× Fibre Channel (2.125 Gbits/s), 4× Fibre Channel (4.25 Gbits/s), 8× Fibre Channel (8.5 Gigabits/s), or 10 Gigabit Ethernet (10 Gigabits/s) will also yield excellent results at low cost, without resorting to complex wave division multiplexing schemes. Over shorter distances, electrical connections over coaxial cable, twinax, or twisted pair may be used to connect master control console 46 bidirectionally to any of the 3D camera systems 1-3. These electrical connections may use Ehthernet signaling standards, Fibre Channel signaling standards, or other popular serial transmission standards, and may be transformer coupled or capacitively coupled, and may make use of time division multiplexing to send camera command and control signals upstream from master control console 46. An alternative embodiment uses a frequency division multiplexing scheme as shown in FIG. 10. to create a separate command and control uplink from master control console 46 to 3D camera system 1 (12, 14) using the same shared physical media.

Continuing with FIG. 2, production van 2 also has a Global Positioning Satellite receiver 48 and antenna 4 for precisely determining the position of the production van 2. The position of production van 2 may be accurately and precisely established in the alternative by triangulation from surveyor's marks or positioning thereon. Master control console 46 also connects to a SkyCam® overhead mobile camera 28 which has an internally mounted modular ladar sensor unit 29 of the type shown in FIG. 5A-D. A bidirectional fiber optic link via fiber optic cable 31 connects between master control console 46 and 3D SkyCam® overhead mobile camera 28. The mobile overhead camera 28 may be a SkyCam® or other brand, and will typically have at minimum an inertial reference, pointing and positioning servo motors, and a stabilization controller, as well as all of the standard features of a typical professional video camera. The 3D sky camera 28 is typically suspended over the field of play/stage 18 by a system of traversing cables 26 suspended from stanchions 24 or other vertical support feature of arena/stadium/set 44. A second 3D camera system (32, 14) is mounted atop a second wheeled dolly 50 and connected via a second bidirectional fiber optic link and fiber optic cable 34. Use of a second 3D camera system (32, 14) allows for a major reduction in shadows where no 3D pixels would otherwise be measureable, owing to the single point of active illumination provided by a system where only a first 3D camera system (12, 14) might be available. A third 3D camera system (38, 14) is mounted atop a tracked dolly 39 and connected via a third bidirectional communications link, in this case an electrical cable 36. Use of a third 3D camera system (32,14) allows for further reduction in shadows where no 3D pixels would otherwise be measureable, owing to the dual points of active illumination provided by a system where only two 3D camera systems (12, 14) & (32, 14) might be available. The use of a tracked dolly 39 and rails 40 allows the 3D camera system to be rapidly moved along the major axis of the action, as in a scoring football play, from goalpost to goalpost 20. This ability to rapidly track a moving play allows for a much higher resolution 3D picture to be maintained in the instances where the distance from a high mounted first or second 3D camera system (32, 14) such as platform 10 may mean only reduced resolution 3D images would be available for scoring events at or near an opposing goalpost 20 as in the scoring field goal kick shown in the diagram of FIG. 1. 3D sky camera 28 is an example of an overhead mobile camera, and may be considered the fourth 3D camera system of this example, combining the advantages of rapid traversing with a unique high-angle perspective not available in any other type of fixed platform or mobile tracked installation. Any of the 3D camera systems 1-4 may be connected via electrical cable as opposed to fiber optic cable, or wirelessly, depending on many factors, including frame rate, distance, and EMI environment, without changing the nature or benefits of the invention as described. Fiber optic links are preferred due to their high data security, low loss, high bandwidth, low radiated EMI levels, low EMI susceptibility, reduced weight & volume, and ease of deployment. The system as described in FIGS. 1 & 2 may also be used in surveillance applications, with the surveillance space covered by any number of cameras of both the 2D and 3D variety, together with those of combined capability. In surveillance applications, the ability to rapidly upgrade to 3D video is of major value, and the modular ladar sensor 14 or 29 is expected to find many such applications where high value targets or defensible spaces are being surveyed and monitored.

FIG. 3 shows a modular ladar sensor 14 of a type quickly connectable through an external cable assembly to a host platform, in this case a professional video camera 12. Professional video camera 12 has a DB-25 electrical connector receptacle with a metallic shell 52 and bosses 54 attached securely to an exterior surface by sheet metal screws, rivets, clips, or other fastener (fasteners not shown). Bosses 54 are drilled and tapped to accept a jackscrew 58 which may have a Phillips head, slot head, or socket head screw. A cable assembly with a plug at a first end connects to the DB-25 electrical connector receptacle (52, 54) of the professional video camera 12. Jackscrew 58 is retained in flange 60 of the mating DB-25 connector plug, typically by a sheet metal clip. The DB-25 connector plug has a metallic shell 56 with flanges 60 for securing the DB-25 connector plug to the chassis of the professional video camera 12. The DB-25 connector is a pin-and-socket connector with 25 mating pin/socket pairs, with the pins typically retained in the plug and the sockets retained in the receptacle. The back end of each pin typically has a solder cup or crimp style ferrule where individual insulated wires 66 may be soldered, crimped, or permanently affixed by other method. A bundle of 25 insulated wires 66 within the dotted line boundary 68 may be overmolded in a flat ribbon style or circular cable style, or may be left loose, placed in a loose tube sheath, or covered with a heat-shrink tubing and heat cured. Only 8 insulated wires 66 are shown in the drawing for the sake of clarity. A flexible rubber or polymer strain relief 70 is overmolded onto the back of connector shell 56 and the solder or crimp joints between the individual pins of the DB-25 connector and wires 66. The cable assembly is completed by a second DB-25 connector plug at a second end comprised of the same components as the first end. The DB-25 connector plug at the second end of the cable assembly connects to a DB-25 electrical connector receptacle which has a metallic shell 52 and bosses 54 permanently attached to an exterior panel of the modular ladar sensor 14. Modular ladar sensor 14 also has a bayonet style optical mount 62 for receiving a modular lens assembly 64 with the mating bayonet fitting. In some cases, one or more of the insulated wires 66 of the cable assembly may be replaced by an optical fiber cable, and the electrical pin and socket pairs of the DB-25 electrical connector plug and receptacle also replaced with the proper ferrules, split sleeves, or precision cylindrical fittings of an optical connector pair. The modular ladar sensor 14 receives power and ground connections from a host platform (video camera 12 in this case) through the DB-25 connector as well as command and control signals from a controller on the host platform. The modular ladar sensor 14 also returns 3D data and internal status signals to a controller on the host platform (video camera 12 in this case).

FIG. 4 shows a modular ladar sensor 14 of a type quickly connectable through a DB-25 electrical connector mating pair to a host platform, in this case a professional video camera 12. Professional video camera 12 has a DB-25 electrical connector receptacle with a metallic shell 52 and bosses 54 attached securely to an exterior surface by sheet metal screws, rivets, clips, or other fastener. The "D" shaped connector is a type of "keyed" connector, which ensures the plug and receptacle may only be mated in the proper orientation. The metallic shell 52 provides EMI shielding as well as a surface at ground potential, which allows for controlled impedance electrical transmission through the connector. The connector receptacle fasteners are typically interior to the video camera housing 12, and are not shown. Bosses 54 are drilled and tapped to accept a jackscrew 58 which may have a Phillips head, slot head, or socket head screw. Jackscrew 58 is retained in flange 60 of the mating DB-25 connector plug, typically by a sheet metal clip. The DB-25 connector plug is permanently affixed to an exterior surface of modular ladar sensor 14, and has a metallic shell 56 with flanges 60 for quickly securing the DB-25 connector plug to the chassis of the professional video camera 12. The DB-25 electrical connector pair is a pin-and-socket connector with 25 mating pin/socket pairs, with the pins typically retained in the plug and the sockets retained in the receptacle. The back end of each pin of the DB-25 connector plug protrudes into the interior of modular ladar sensor 14, and typically has a printed circuit board right angle or straddle mount connector. The back end of each pin of the DB-25 connector plug may alternatively have a solder cup or crimp style ferrule where individual insulated wires may be soldered, crimped, or permanently affixed by other method. The DB-25 connector plug mounted to the modular ladar sensor 14 in the drawing of FIG. 4 connects to the DB-25 electrical connector receptacle of the professional video camera 12 which has shell 52 and bosses 54 permanently attached to an exterior panel. For a modular ladar sensor 14 with moderate size and weight, the DB-25 electrical connector plug and receptacle pair provide both electrical connection and mechanical support and retention. Modular ladar sensor 14 also has a bayonet style optical mount 62 for receiving a modular lens assembly 64 with the mating bayonet fitting. In some cases, one or more of the electrical pin and socket pairs of the DB-25 electrical connector plug and receptacle may be replaced with the proper ferrules, split sleeves, or precision cylindrical fittings of an optical connector pair. The modular ladar sensor 14 receives power and ground connections from a host platform (video camera 12 in this case) through the DB-25 connector as well as command and control signals from a controller on the host platform. The modular ladar sensor 14 also returns 3D data and internal status signals to a controller on the host platform (video camera 12 in this case).

FIG. 5A shows a variant of the modular ladar sensor 14 as a modular ladar sensor unit 29 which is adapted for plugging into a recessed cavity within a host platform such as SkyCam® 28 or professional video camera 12. A recessed cavity in professional video camera 12 has an opening 116 defined by a cutout in a front panel 74 of the housing 118 of professional video camera 12. Shown in FIG. 5A, housing 118 is typically formed of bent sheet metal for industrial use cameras, or may be a zinc or aluminum casting for high end video production cameras, or may be formed of an injection molded high impact plastic for consumer grade cameras. In any case, housing 118 must also serve as an electronic enclosure, and must contain any electromagnetic interference (EMI) signals radiated by the high speed electronics of the ladar sensor 29 as well as the 2-D imaging electronics of the professional video camera 12. This requires the housing 118, to be conductive, and bent sheet metal, metallic castings, and molded plastic housings 118 must have conductive surfaces either from metallic plating, applied chemical films such as zincate or chromate processes, or evaporated metallic coatings applied under vacuum in the case of a plastic molded housing 118. Alternatively, the housing 118 may be formed of a conductive plastic or conductive carbon fiber, though a conductive surface may still need to be applied in the form of electroless plating, electroplating, physical vapor deposition, sputtering, or flame spray. Front panel 74 also has retention features 120 which may be tapped holes, ¼ turn fasteners, or snap features situated so as to mechanically secure modular ladar sensor unit 29 within the recessed cavity defined by opening or cutout 116. Also shown in FIG. 5A is an aspect of guide slot 104 where it appears near opening 116. Dashed line AA shows the mating or plugging axis of modular ladar sensor unit 29, shown with either an integrated single optic 100, or as a module incorporating independent transmit optics 78 and receive optics 76. The modular ladar sensor unit 29 shown with a single integrated optic 100 features a mounting panel 60 and guide beams 84 on either side of the package designed to engage with the mating guide slots 104 at either side of opening 116. If the professional video camera is operated without a modular ladar sensor unit 29 in place, a conductive cover plate 98 is secured with screws 58 mating to tapped holes 120 in front panel 74. A conductive gasket 96 made of silver wire mesh, conductive elastomer, or deformable soft metal is typically sandwiched between cover plate 98 and front panel 74 to ensure a low leakage EMI seal. The modular ladar sensor unit 29 which features independent receive optic 76, and transmit optic 78 is shown with guide beams 84 and an optional quick connect retention feature 92 which is shown in greater detail in FIG. 5C. Within dashed circle BB is shown a side of modular ladar sensor unit 29 with a boss 94 securing and receiving contoured leaf spring 92, which is bent so as to snap into the cross section of front panel 74 and be retained there. The retention feature 92 may be a contoured leaf spring as shown, or may be a screw, ¼ turn fastener, snap or other convenient mechanism which interacts with the mating retention feature 120 of housing 118 without altering the intent or beneficial effects of the instant invention. FIG. 5A shows a visible lens system 72 attached to professional video camera 12, which may be a fixed lens, zoom lens, or diffractive optic. Molded guide rail 102 incorporates guide slot 104 and is also shown in FIG. 5D integrally molded within plastic cage 106. Cage 106 has "J" hook features 108 designed to affix the cage 106 assembly to a support structure. Cage 106 may also have conductive EMI spring fingers 110 attached and a spring loaded conductive door 112 with pivots 114 assembled thereto. The "J" hooks 108 are designed to snap into openings in a supporting structure such as printed circuit board 80 shown in FIG. 5B. The spring fingers 110 are designed to both brush against a conductive surface of modular ladar sensor unit 29 in the interior space of cage 106, and to press against the edges of opening 116 in front panel 74, making a continuous conductive path from modular ladar sensor unit 29 to front panel 74 of electronic enclosure 118. Conductive door 112 makes the housing 118 into an EMI sealed electronic enclosure whenever modular ladar sensor unit 29 is not inserted into the professional video camera 12. The outer surfaces of modular ladar sensor unit 29 must be conductive in selected areas and may be a cast aluminum or zinc housing plated with a thin protective layer of copper, nickel, silver, chrome, gold, or other suitable metal. The housing of modular ladar sensor unit 29 may also be molded from plastic and electroplated, or coated with stainless steel in a PVD vacuum process, or coated by flame spray, RF assisted sputtering, or may alternatively have a formed metal sheet or foil applied and secured with adhesive, clips, crimping, or other cold forming technique, or secured by reflowing part of a previously molded plastic feature. The pivots 114 are spring loaded when inserted into the assembly of cage 106 so conductive door 112 is pressed securely against the interior surface of front panel 74 when the modular ladar sensor unit 29 is not inserted into the host platform. When a modular ladar sensor unit 29 is inserted, conductive door 112 swings inward and upward, allowing for the modular ladar sensor unit 29 to be guided inward along guide rails 102 and plugged into a recessed connector such as the "D" style connector with shell 52 and mounting flange 86 shown at the rear of cage assembly 106 in FIG. 5D. Guide rails 102 may alternatively have guide beams 84, and modular ladar sensor unit 29 may have a guide slot 104 formed thereon, or any combination of rails and slots may be used on modular ladar sensor unit 29 and within cutout 116 of housing 118 without appreciably altering the operation or benefits of the instant invention.

FIG. 5B shows a plan view with modular ladar sensor unit 29 mounted to a host circuit board 80 of professional video camera 12. Not shown is the cage assembly 106, but attachment points 82 are shown which may be slots cut in the PC board material to accommodate the "J" hooks 108 of the molded cage 106. A "D" style connector receptacle with shell 52 and flange 86 is mounted to the PC board by screws 88, and right angle connector pins 90 solder to plated through holes of PC board 80, making electrical connections between the host platform and the modular ladar sensor unit 29. "D" style electrical connector plug with shell 56 at the rear of modular ladar sensor unit 29 makes electrical connections with the mating "D" type connector receptacle mounted to the PC board with guide beams 84 (shown in profile) engaging with the guide rails 102 as shown in the other views of FIG. 5A-D. A cross section of front panel 74 shows interior bosses 54, which may be threaded nuts spot welded to the inside of front panel 74, and which receive jack screws 58. Jack screws 58 mount through clearance holes in flange 60 of modular ladar sensor unit 29, and secure it mechanically to a host platform, in this case professional video camera 12. The quick connect and disconnect features detailed within dashed line circle BB may be used at either side of modular ladar sensor unit 29 as an alternative mounting method to the jack screws and retaining nuts shown in FIG. 5B. The modular ladar sensor unit 29 receives power and ground connections from a host platform (video camera 12 in this case) through the DB-25 connector as well as command and control signals from a controller on the host platform. The modular ladar sensor unit 29 also returns 3D data and internal status signals to a controller on the host platform (video camera 12 in this case).

Figure 6:
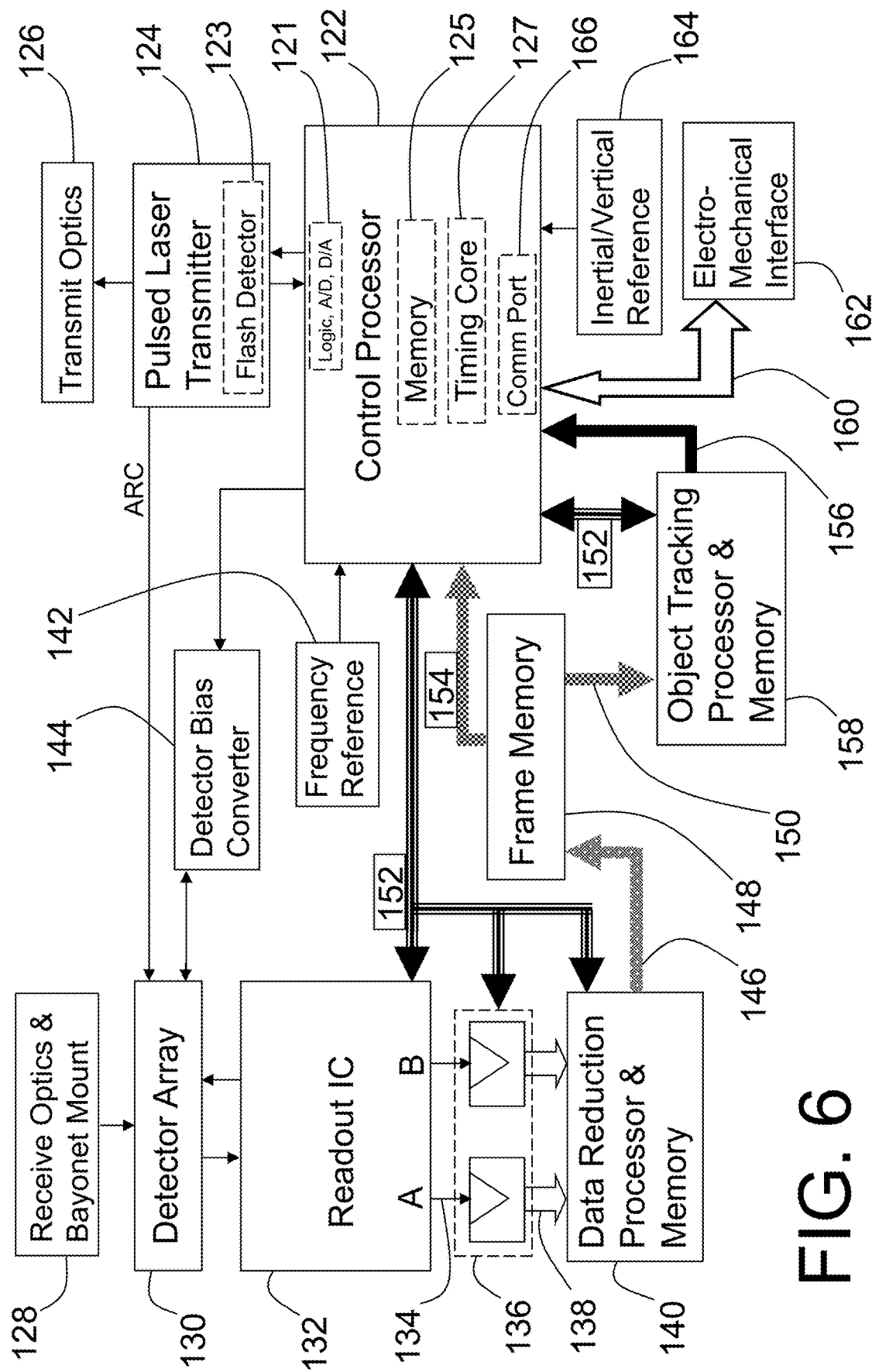
FIG. 6 is a system block diagram of the modular ladar sensor and the internal workings as well as external connections.

The major functional elements of modular ladar sensor unit 29 (or the more generalized modular ladar sensor 14), are depicted in block diagram form in FIG. 6. A control processor 122 controls the functions of the major components of the modular ladar sensor unit 29 or modular ladar sensor 14. Control processor 122 connects to pulsed laser transmitter 124 through bidirectional electrical connections (with logic, analog to digital (A/D) and digital to analog (D/A) converters 121) which transfer commands from system controller 122 to pulsed laser transmitter 124 and return monitoring signals from pulsed laser transmitter 124 to the system controller 122. A light sensitive diode detector (Flash Detector) 123 is placed at the back facet of the laser so as to intercept a portion of the laser light pulse produced by the pulsed laser transmitter 124. An optical sample of the outbound laser pulse taken from the front facet of pulsed laser transmitter 124 is routed to a corner of the detector array 130 as an automatic range correction (ARC) signal, typically over a fiber optic cable. The pulsed laser transmitter 124 may be a solid-state laser, monoblock laser, semiconductor laser, fiber laser, or an array of semiconductor lasers. It may also employ more than one individual laser to increase the data rate. In an example embodiment, pulsed laser transmitter 124 is an array of vertical cavity surface emitting lasers (VCSELs). In an alternative embodiment, pulsed laser transmitter 124 is a disc shaped solid state laser of erbium doped phosphate glass pumped by 976 nanometer semiconductor laser light.

In operation, the control processor 122 initiates a laser illuminating pulse by sending a logic command or modulation signal to pulsed laser transmitter 124, which responds by transmitting an intense pulse of laser light through transmit optics 126. In the case of a solid state laser based on erbium glass, neodymium-YAG, or other solid-state gain medium, a simple bi-level logic command may start the pump laser diodes emitting into the gain medium for a period of time which will eventually result in a single flash of the pulsed laser transmitter 124. In the case of a semiconductor laser which is electronically pumped, and may be modulated instantaneously by modulation of the current signal injected into the laser diode, a modulation signal of a more general nature is possible, and may be used to great effect as is illustrated in the discussions with respect to FIG. 7. The modulation signal may be a flat-topped square or trapezoidal pulse, or a Gaussian pulse, or a sequence of pulses. The modulation signal may also be a sinewave, gated or pulsed sinewave, chirped sinewave, or a frequency modulated sinewave, or an amplitude modulated sinewave, or a pulse width modulated series of pulses. The modulation signal is typically stored in on-chip memory 125 as a lookup table of digital memory words representative of analog values, which lookup table is read out in sequence by control processor 122 and converted to analog values by an onboard digital-to-analog (D/A) converter 121, and passed to the pulsed laser transmitter 124 driver circuit. The combination of a lookup table stored in memory 125 and a D/A converter, along with the necessary logic circuits, clocks, and timers 127 resident on control processor 124, together comprise an arbitrary waveform generator (AWG) circuit block. The AWG circuit block may alternatively be embedded within a laser driver as a part of pulsed laser transmitter 124. In an alternative embodiment, a pulse width mode (PWM) control output is provided by control processor 122, which performs the same function as the AWG of the first preferred embodiment in a slightly different manner. The advantage of a PWM control output is in the simplicity afforded to the design of a RISC processor which may be used as control processor 122. PWM control outputs are typically fully saturated digital outputs which vary only in duty cycle or pulse width. The basic pulse rate may be as high as 20 MHz-100 MHz, but filtering or integration at the control input to the pulsed laser transmitter 124 may have a lowpass filtering effect with a 3 dB corner frequency as low as 0.1-10 MHz. The use of a PWM output instead of a D/A structure means a RISC processor may be formed in a fully digital process, instead of a mixed analog/digital integrated circuit process, and at a much lower cost. Were the control processor 122 to be manufactured in a fully digital process, the A/D converter 121 shown in FIG. 6 would have to be eliminated from the chip, and either the analog/digital feedback eliminated entirely, or the A/D converter realized in a separate, special purpose chip. Transmit optics 126 diffuses the high intensity spot produced by pulsed laser transmitter 124 substantially uniformly over the desired field of view to be imaged by the modular ladar sensor unit 29 or modular ladar sensor 14. An optical sample of the transmitted laser pulse (termed an ARC signal) is also sent to the detector array 130 via optical fiber. A few pixels in a corner of detector array 130 are illuminated with the ARC (Automatic Range Correction) signal, which establishes a zero time reference for the timing circuits in the readout integrated circuit (ROIC) 132. Each unit cell of the readout integrated circuit 132 has an associated timing circuit which is started counting by an electrical pulse derived from the ARC signal. Alternatively, the flash detector 123 signal may be used as a zero reference in a second timing mode. Though the ARC signal neatly removes some of the variable delays associated with transit time through the detector array 132, additional cost and complexity is the result. Given digital representations of the image frames, the same task may be handled in software/firmware by a capable embedded processor such as data reduction processor 140. When some portion of the transmitted laser pulse is reflected from a feature in the scene in the field of view of the modular ladar sensor unit 29 or modular ladar sensor 14, it may be incident upon receive optics 128, which in the case of modular ladar sensor 14 are mounted with a quick connect optics mount, in this case a custom designed bayonet mechanical connection. Pulsed laser light reflected from a feature in the scene in the field of view of receive optics 128 may be collected and focused onto an individual detector element of the detector array 130. This reflected laser light optical signal is then detected by the affected detector element and converted into an electrical current pulse which is then amplified by an associated unit cell electrical circuit of the readout integrated circuit 132, and the time of flight measured. Thus, the range to each reflective feature in the scene in the field of view is measurable by the modular ladar sensor 14 or modular ladar sensor unit 29. The detector array 130 and readout integrated circuit 132 may be an M×N or N×N sized array. Transmit optics 126 consisting of a spherical lens, cylindrical lens, holographic diffuser, diffractive grating array, or microlens array, condition the output beam of the pulsed laser transmitter 122 into a proper conical, elliptical, or rectangular shaped beam for illuminating a central section of a scene or objects in front of the host platform as in the case of professional video camera 12, and illustrated in FIG. 1.

Continuing with FIG. 6, receive optics 128 may be a convex lens, spherical lens, cylindrical lens or diffractive grating array. Receive optics 128 collect the light reflected from the scene and focus the collected light on the detector array 130. Traditionally, detector array 130 has been formed on an indium phosphide semiconducting substrate with a set of cathode contacts exposed to the light and a set of anode contacts electrically connected to the supporting readout integrated circuit 132 through a number of indium bumps deposited on the detector array 130. The cathode contacts of the individual detectors of detector array 130 would then be connected to a high voltage detector bias grid on the illuminated side of the array. Each anode contact of the detector elements of detector array 130 is thus independently connected to an input of a unit cell electronic circuit of readout integrated circuit 132. This traditional hybrid assembly of detector array 130 and readout integrated circuit 132 may still be used, but a new technology may reduce inter-element coupling, or crosstalk, and reduce leakage (dark) current and improve efficiency of the individual detector elements of detector array 130. In the new preferred method, the elements of detector array 130 may be formed atop a substantially monocrystalline sapphire wafer. Readout integrated circuit 132 comprises a rectangular array of unit cell electrical circuits, each unit cell with the capability of amplifying a low level photocurrent received from an optoelectronic detector element of detector array 130, sampling the amplifier output, and detecting the presence of an electrical pulse in the unit cell amplifier output associated with a light pulse reflected from the scene and intercepted by the detector element of detector array 130 connected to the unit cell electrical input. The detector array 130 may be an array of avalanche photodiodes, capable of photoelectron amplification, and modulated by an incident light signal at the design wavelength. The detector array 130 elements may also be a P-intrinsic-N design or N-intrinsic-P design with the dominant carrier being holes or electrons respectively; the corresponding ROIC 132 would potentially have the polarity of the bias voltages and amplifier inputs adjusted accordingly.

Figure 15:
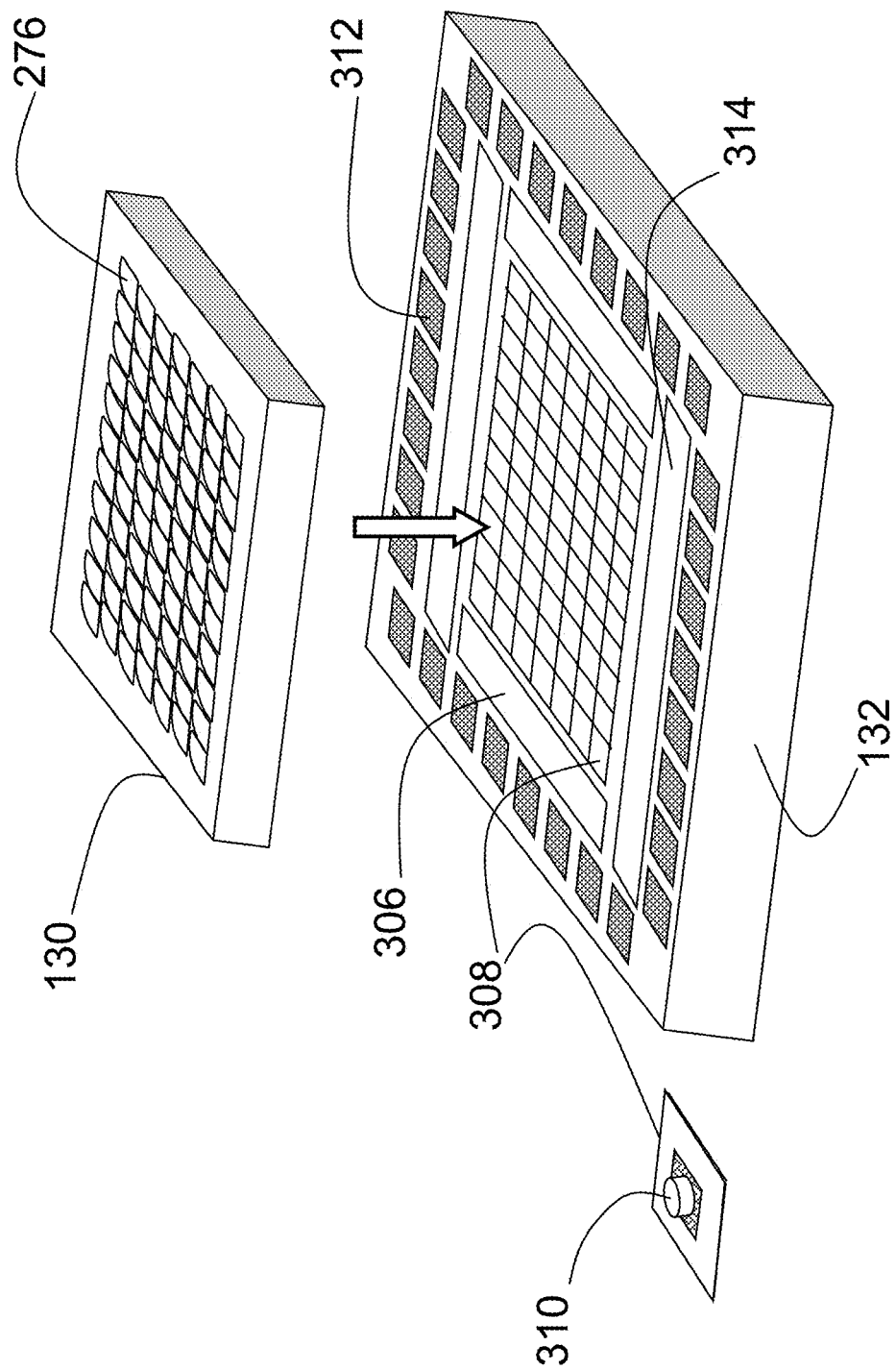
FIG. 15 illustrates the hybrid assembly of a focal plane array of detectors onto a readout integrated circuit of the present invention.

The hybrid assembly of detector array 130 and readout integrated circuit 132 of the example embodiment is shown in FIG. 15, and the assembly is then mounted to a supporting circuit assembly, typically on a FR-4 substrate (not shown). The circuit assembly provides support circuitry which supplies conditioned power, a reference clock signal, calibration constants, and selection inputs for the readout column and row, among other support functions, while receiving and registering range and intensity outputs from the readout integrated circuit 132 for the individual elements of the detector array 130. Many of these support functions may be implemented in RISC processors which reside on the same circuit assembly. A detector bias converter circuit 144 may apply a time varying detector bias to the detector array 130 which provides optimum detector bias levels to reduce the hazards of saturation in the near field of view of detector array 130, while maximizing the potential for detection of distant objects in the field of view of detector array 130. The contour of the time varying detector bias supplied by detector bias converter 144 is formulated by control processor 122 based on inputs from the data reduction processor 140, indicating the reflectivity and distance of objects or points in the scene in the field of view of the detector array 130. Control processor 122 also provides several clock and timing signals from a timing core 127 to readout integrated circuit 132, data reduction processor 140, analog-to-digital converters 136, object tracking processor 158, and their associated memories. Control processor 122 relies on a temperature stabilized frequency reference 142 to generate a variety of clocks and timing signals. Temperature stabilized frequency reference 142 may be a temperature compensated crystal oscillator (TCXO), dielectric resonator oscillator (DRO), or surface acoustic wave device (SAW). Timing core 127 resident on control processor 122 may include a high frequency tunable oscillator, programmable prescaler dividers, phase comparators, and error amplifiers.

Control processor 122, data reduction processor 140, and object tracking processor 158 each have an associated memory for storing programs, data, constants, and the results of operations and calculations. These memories, each associated with a companion digital processor, may include ROM, EPROM, or other non-volatile memory such as flash. They may also include a volatile memory such as SRAM or DRAM, and both volatile and non volatile memory may be integrated into each of the respective processors. A common frame memory 148 serves to hold a number of frames, each frame being the image resulting from a single laser pulse. There are two modes of data collection, the first being SULAR, or a progressive scan in depth. Each laser pulse typically results in 20 "slices" of data, similar to a CAT scan, and each "slice" may be stored as a single page in the common frame memory 148. With each pixel sampling at a 2 nanosecond interval, the "slices" are each a layer of the image space at roughly 1 foot differences in depth. The 20 slices represent a frame of data, and the sampling for a succeeding laser pulse may be started at 20 feet further in depth, so that the entire image space up to 1000 feet in range or depth, may be swept out in a succession of 50 laser illuminating pulses, each laser pulse response consisting of 20 "slices" of data held in a single frame entry. In some cases, the frame memory may be large enough to hold all 50 frames of data. The reduction of the data might then take place in an external computer, as in the case of data taken to map an underwater surface, or a forest with tree cover, or any static landscape, where sophisticated post-processing techniques in software may yield superior accuracy or resolution. A second data acquisition mode is the TRIGGER mode, where the individual pixels each look for a pulse response, and upon a certain pulse threshold criteria being met, the 20 analog samples bracketing the pulse time of arrival are retained in the pixel analog memories, and a running digital counter is frozen with a nominal range measurement. The 20 analog samples are output from each pixel through the "A" and "B" outputs 134 of readout integrated circuit 132, which represent the interleaved row or column values of the 128×128 pixel of the present design. The "A" and "B" outputs are analog outputs, and the analog samples presented there are converted to digital values by the dual channel analog-to-digital (A/D) converter 136. Interleaving the outputs means one of the outputs ("A") reads out the odd numbered lines of the readout IC 132, and the other output ("B") reads out the even numbered lines of the readout IC 132. The digital outputs 138 of the A/D converters 136 connect to the inputs of the data reduction processor 140. The digital outputs 138 are typically 10 or 12 bit digital representations of the uncorrected analog samples measured at each pixel of the readout IC 132, but other representations with greater or fewer bits may be used, depending on the application. The rate of the digital outputs 138 depends upon the frame rate and number of pixels in the array. The digital range representations from each pixel are output to a common bidirectional digital data bus 152 and transfer thus to data reduction processor 140. In this second mode, a great deal of data reduction has already transpired, since the entire range or depth space may be swept out in the timeframe of a single laser pulse, and the data reduction processor 140 would only operate on the 20 analog samples of each pixel in order to refine the nominal range measurement received from each pixel. The data reduction processor 140 refines the nominal range measurements received from each pixel by curve fitting of the analog samples to the shape of the outgoing laser illuminating pulse, which is preserved by the reference ARC pulse signal. In TRIGGER acquisition mode, the frame memory 148 only needs to hold a "point cloud" image for each illuminating laser pulse. The term "point cloud" refers to an image created by the range and intensity of the reflected light pulse as detected by each pixel of the 128×128 array of the present design. In this second mode, the data reduction processor serves mostly to refine the range and intensity (R&I) measurements made by each pixel prior to passing the R&I data to the frame memory 148 over data bus 146, and no "slice" data or analog samples are retained in memory independently of the R&I "point cloud" data in this acquisition mode. Frame memory 148 provides individual or multiple frames, or full point cloud images, to control processor 122 over data bus 154, and to an optional object tracking processor 158 over data bus 150 as requested.

Typically, data reduction processor 140 and control processor 122 are of the same type, a reduced instruction set (RISC) digital processor with hardware encoded integer and floating point arithmetic units. Object tracking processor 158 may also be of the same type as RISC processors 140 and 122, but may in some cases be a processor with greater capability, suitable for highly complex graphical processing. Object tracking processor 158 may have in addition to hardware encoded integer and floating point arithmetic units, a number of hardware encoded matrix arithmetic functions, including but not limited to; matrix determinant, matrix multiplication, and matrix inversion. In operation, the control processor 122 controls readout integrated circuit 132, A/D converters 136, data reduction processor 140 and object tracking processor 158 through a bidirectional control bus 152 which allows for the master, control processor 122 to pass commands on a priority basis to the dependent peripheral functions; readout IC 132, A/D converters 136, data reduction processor 140, and object tracking processor 158. Bidirectional control bus 152 also serves to return status and process parameter data to control processor 122 from readout IC 132, A/D converters 136, data reduction processor 140, and object tracking processor 158. Bus 152 is also used to pass uncorrected digital range representations to data reduction processor 140. Data reduction processor 140 refines the nominal range data and adjusts each pixel intensity data developed from the digitized analog samples received from A/D converters 136, and outputs a full image frame via unidirectional data bus 146 to frame memory 148, which is a dual port memory having the capacity of holding several frames to several thousands of frames, depending on the application. Object tracking processor 158 has internal memory with sufficient capacity to hold multiple frames of image data, allowing for multi-frame synthesis processes, including video compression, single frame or multi-frame resolution enhancement, statistical processing, and object identification and tracking. The outputs of object tracking processor 158 are transmitted through unidirectional data bus 156 to a communications port 166, which may be resident on control processor 122. All slice data, range and intensity data, control, and communications then pass between communications port 166 and a host platform through bidirectional connections 160 and electromechanical interface 162. Power and ground connections (not shown) may also be supplied through electromechanical interface 162 Connections 160 may be electrical or optical transmission lines, and electromechanical interface 162 may be a DB-25 electrical connector, or a hybrid optical and electrical connector, and the mechanical interface may be just the mechanical structure of the DB-25 connector and associated screws, or it may include other mechanical support and retention mechanisms, such as guide rails, retention latches, etc. Bidirectional connections 160 may be high speed serial connections such as Ethernet, USB or Fibre Channel, or may also be parallel high speed connections such as Infiniband, etc., or may be a combination of high speed serial and parallel connections, without limitation to those listed here. Bidirectional connections 160 also serve to upload information to control processor 122, including program updates for data reduction processor 140, object tracking processor 158, and global position reference data, as well as application specific control parameters for the remainder of the modular ladar sensor unit 29 or 14 functional blocks. Inertial/vertical reference 164 is utilized in addition to external position references by control processor 122, which may pass position and inertial reference data to data reduction processor 140 for adjustment of range and intensity data, and to object tracking processor 158 for utilization in multi-frame data synthesis processes. The vertical reference commonly provides for measurement of pitch and roll, and is adapted herein to readout an elevation angle, and a twist angle (analogous to roll) with respect to a horizontal plane surface the modular ladar sensor unit 29 or modular ladar sensor 14 and/or the professional video camera 12 may be mounted on. A host platform such as professional video camera 12 may have a number of connector receptacles generally available for receiving mating connector plugs from USB, Ethernet, RJ-45, or other interface connection, and which may alternatively be used to attach a modular ladar sensor 14 or modular ladar sensor unit 29 of the type described herein.

The use of a semiconducting laser in a preferred embodiment allows for tailoring of the drive current to a VCSEL laser, one example of a semiconductor laser, or any diode laser, so as to produce a Gaussian optical pulse shape with only slight deviations. The VCSEL response time is in the sub-nanosecond regime, and the typical pulse width might be 5-100 nanoseconds at the half power points. In the diagram of FIG. 6, the VCSEL and laser driver would be part of the pulsed laser transmitter 124, and the desired pulse or waveshape is itself produced by a digital-to-analog converter 121 which has a typical conversion rate of 200-300 MHz, so any deviations in the output pulse shape from the Gaussian ideal may be compensated for in the lookup table in memory 125 associated with control processor 122, which serves as the digital reference for the drive current waveform supplied to the laser driver within pulsed laser transmitter 124 by the D/A converter. A Gaussian single pulse modulation scheme works well at short ranges, given the limited optical power available from a VCSEL laser.

Figure 7:
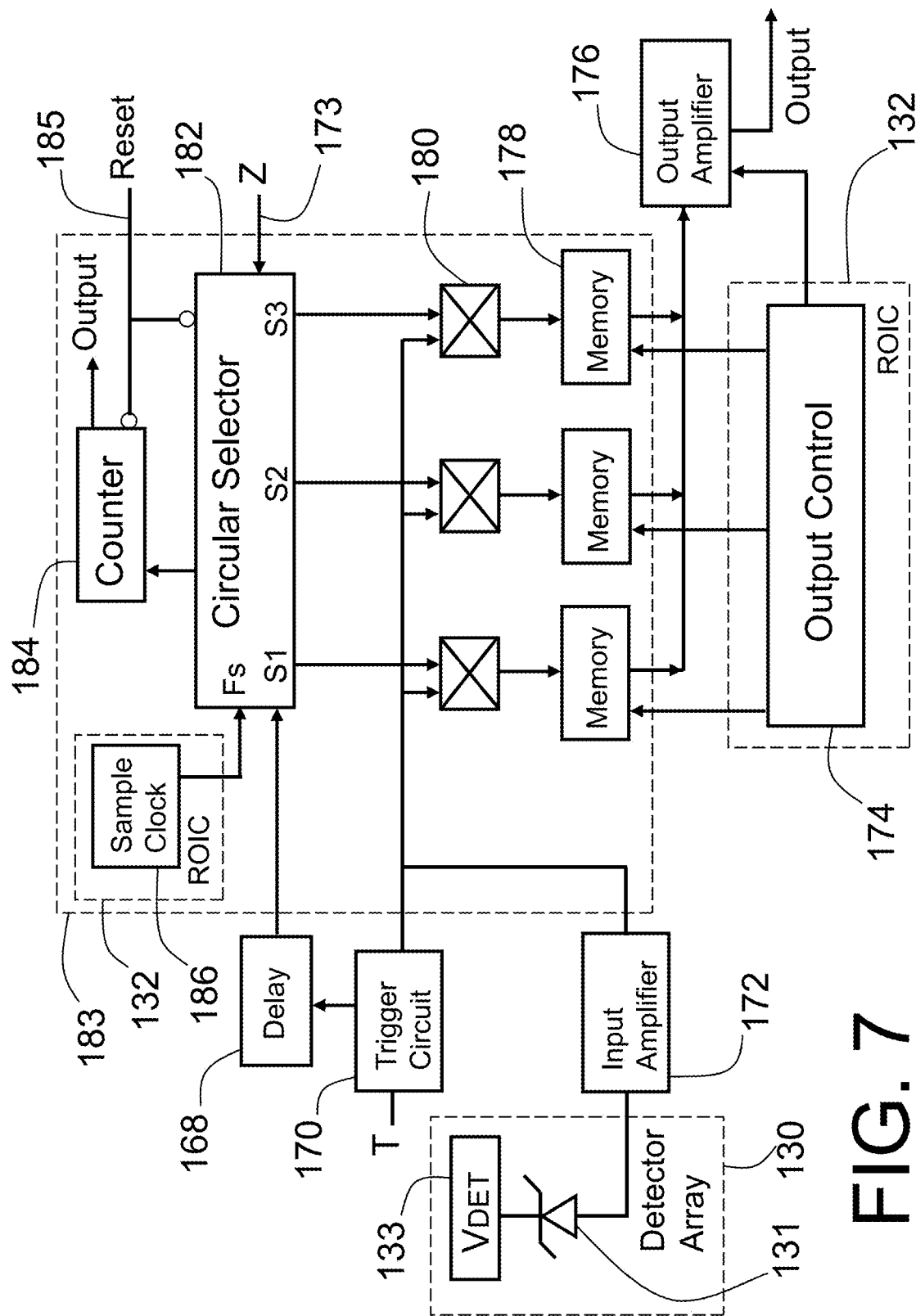
FIG. 7 shows a diagram of the unit cell electronics of the readout integrated circuit associated with each pixel of the detector array of FIG. 6

The unit cell electronics depicted in FIG. 7 is well adapted to work with the Gaussian single pulse modulation scheme of a VCSEL laser, and works advantageously with other modulation schemes as well, including sequences of flat-topped pulses, Gaussian, or otherwise shaped pulses. These pulses may be of varying width and spacing, in order to reduce range ambiguities, and may also be random pulse sequences, or in other cases, Barker coded pulse sequences. In operation, some portion of the pulsed laser light reflected from a surface in the field of view of the modular ladar sensor unit 29 or modular ladar sensor 14 is concentrated and focused by receive optics 128 and falls on an individual detector element 131 of detector array 130. The individual element 131 is typically an avalanche photodiode, but may be a PIN or NIP, or other structure. Each individual element 131 is biased with a voltage by a bias voltage distribution network $V_{DET}$ 133. The reflected light signal incident upon the individual detector element 131 is converted to an electronic signal, typically a photocurrent, and amplified by input amplifier 172, typically a transimpedance amplifier. A current amplifier may also be used as an input amplifier 172 with a current output driving the integrating capacitors of the unit cell memory cells associated with each sampling gate, and the input current waveform thereby sampled and stored as a series of voltage samples. The output of input amplifier 172 is distributed to a trigger circuit 170 as well as a number of analog sampling gates 180. Sampling is typically initiated when an illuminating laser pulse is transmitted, and begins with the first transition of sampling clock 186, which may be a gated free running oscillator. The trigger circuit 170 is typically a threshold voltage comparator, set to trigger when a pulse is received which exceeds a predetermined magnitude, though other pulse detection schemes may be used. After a programmable delay through delay circuit 168, the circular selector 182 is frozen by the logic transition of trigger circuit 170 output. This first mode of operation is called TRIGGER mode. TRIGGER mode is selected by a global input "T" to each unit cell which comes from the common portion of ROIC 132. Prior to the detection of a received pulse by trigger circuit 170, the sample clock 186 causes the state of circular selector 182 to advance, enabling one of the sampling control outputs S1-S3, which in turn causes a sampling of the input amplifier 170 output by one of the sampling gates 180. The number of transitions of sample clock 186 are counted by counter 184, as the circular selector 182 outputs a logic transition to counter 184 for every cycle of the sampling clock after the release of the active low reset line 185. Circular selector 182 may cycle through outputs S1-S3 in order, or may have a different order, depending on the programming. A second circular selector 182, and sample clock 186 may operate in parallel, along with counter 184, analog sampling gates 180 and analog memory cells 178. The combination of sample clock 186, counter 184, circular selector 182, sampling gates 180, and memory cells 178 may be termed a unit cell sampling structure (within dashed line boundary 183) for clarity. Two, three, or more of these sampling structures may be operated in parallel on the output of input amplifier 172, with the advantages of such a structure to be described later in regards to range ambiguity. Shown in FIG. 7 are three sampling gates 180, and analog memory cells 178, but the number may be several hundred or more on some readout ICs 132. A second mode of operation is called SULAR mode, wherein sampling is initiated upon the issuance of an outgoing illuminating laser pulse, and sampling continued until all of the analog memory cells 178 are filled. When the global input "T" is deselected, the mode of operation is set to SULAR. In SULAR mode, sampling may also be initiated at a programmable delay after the issuance of an outgoing illuminating laser pulse. Therefore SULAR mode allows the entire space in the field of view of the ladar to be swept out in sequence if desired, rather than simply focussing on the first reflection large enough to force a transition of the trigger circuit 170. Once all of the analog sample data has been taken, a control command from the control processor 122 initiates a readout cycle by activating output control 174 and output amplifier 176 to readout the contents of the analog memory cells 178 in a predetermined order. Assuming a 1 $cm^2$ VCSEL array with a 5 $kW/cm^2$ power density, and depending upon the reflectivity of the objects in the field of view of the modular ladar sensor unit 29, and the responsivity and excess noise of the detector array 130, the effective range of a Gaussian single pulse modulation scheme might be in the range of 10-20 meters, using a simple threshold detection technique. Without resorting to a large VCSEL array, which might be expensive and might require a voluminous discharge capacitor to supply a massive current pulse, more sophisticated modulation and detection techniques can be used to create additional processing gains, which effectively increase the signal-to-noise ratio, thus extending the range of the modular ladar sensor unit 29 or modular ladar sensor 14 without requiring an increase in power. With a Gaussian single pulse modulation, a detection technique may be employed which uses the digitized analog samples from each unit cell electrical circuit, and processes these samples in a digital matched filter to find the centroid of the received pulse, resulting in significant processing gain. The processing gains resulting from this structure are proportional to the square root of the number of samples used in the filtering algorithm. For example, a unit cell electrical circuit with 256 analog memory cells could yield a processing gain of 16 if all the available analog samples were used in a matched filter algorithm. Assuming the pulsed laser light is distributed uniformly over just the field of view of the receive optics 128, the range also increases as the square root of the transmitted power, and an increase in range to 40-80 meters could be the result.

In a second modulation scheme, a VCSEL array modulated with a series of Barker encoded flat-topped or Gaussian pulses can be sampled by the unit cell electronics of FIG. 7 and analyzed by data reduction processor 140 for range and intensity estimates. In a third modulation scheme, a VCSEL array modulated with a gated sinewave allows for greater cumulative energy to be reflected from a feature in a scene in the field of view of the modular ladar sensor unit 29 or modular ladar sensor 14 without any increase in peak power. Each peak of a gated sinewave will have a separate reflection from an object or feature in the scene in the field of view of the modular ladar sensor unit 29 or modular ladar sensor 14, and the unit cell electrical circuit of FIG. 7 allows the ladar sensor receiver to respond to the cumulative energy from many of these reflected pulses using a minimum of circuitry. The waveform in a preferred embodiment is a number of sinewave cycles, and the number could be quite large, depending on a number of factors. The receiver circuitry of the unit cell electronics shown in FIG. 7 is capable of sampling or of synchronously detecting the cumulative energy of the returned pulse peaks. Two modes of sampling are supported by the unit cell sampling structure shown in FIG. 7. When taking analog samples of single pulse or multi pulse sequences, wherein analog samples of an incoming waveform are being sequentially taken, the sampling impedance control 173 (Z) to the circular selector 182 is set to a minimum value. The sampling frequency of sample clock 186 is also selected to produce 10 or perhaps 20, analog samples during each pulse width. When the sampling impedance control 173 is set to a minimum, the sample controls S1, S2, S3 . . . turn on with full voltage during a sampling cycle. Since each sampling gate 180 is a field effect transistor, increasing the sample control voltage S1-S3 will increase the gate-source voltage on the sampling FET, thus lowering the resistance of the channel between source and drain, and setting the sampling gate 180 series resistance to a minimum. When the sampling gate 180 impedance is set to a minimum, the storage capacitor serving as analog memory cell 178 charges rapidly to the voltage present at the output of input amplifier 172. This mode can be termed "instantaneous voltage sampling" to distinguish the mode from a second sampling mode, which is selected when the sampling impedance control 173 is set to a higher, or even maximum value. When the sampling impedance control 173 is selected for high impedance, or maximum series resistance value, the outputs S1-S3 would be at or near minimum voltages when enabled, resulting in a lower gate-source voltage across each of the sampling gate FETs 180, and thus a higher sampling gate series resistance in the channel between source and drain of each sampling gate 180 FET. With the series resistance of the sampling gates 180 set to high or maximum value, the effect is to cause an R-C filter to develop, with the analog memory cell 178 storage capacitor performing as an integrating capacitor. This second sampling mode may be very useful when a sinusoidal modulation is applied to the pulsed laser transmitter 124 in the case where the laser is a semiconductor laser, typically a high efficiency VCSEL. By applying a sampling clock 186 through the S1 output to the sampling gate 180, and which is the same frequency as the sinusoidal modulation, a sum frequency and a difference frequency will be in the sampled signal, and the analog memory cell 178 storage capacitor will filter out the sum frequency, and the difference frequency will be zero, leaving only a DC voltage component representing the phase difference remaining. Over a number of cycles of the sinusoidal modulation from the output of input amplifier 172, this DC voltage will emerge as the sine or cosine of the phase difference. This phase difference is proportional to the range to a reflecting surface. To improve the processing gain, the second sampling gate driven by the S2 signal is driven by the same sampling clock frequency, but shifted by 90 degrees in phase, and the greater of the two DC voltages, or a ratio of the two voltages, may used to estimate phase, and thereby range. Typically, a ratio of phase measurements is preferred, since it eliminates amplitude variations in the return signal as an error term. In this second sampling mode, circular selector 182 acts to pass the sampling frequency present at the Fs input straight through to the S1 output, and a 90° phase shifted copy of Fs to the S2 output. A third phase shifted version of the sampling frequency Fs, perhaps a 45 degree phase shifted copy of Fs, may be passed through to the S3 output, and so on until each sampling gate 180 in the unit cell sampling structure 183 has a copy of the Fs sampling clock frequency signal, each with a unique phase. Alternatively, all of the sampling gates 180 may be supplied only with 0° and 90° phase shifted copies of the Fs sampling frequency. In either case, the results read out from the memory cells 178 may be combined externally in the data reduction processor 164 to achieve significant processing gains. Thus, the sampling gates 180 can be operated as instantaneous voltage samplers in a first sampling mode, or as frequency mixers in a second sampling mode, depending on the state of the sampling impedance control 173, and the frequency applied by sampling clock 186. In the first sampling mode, the shape of a pulse or sequence of pulses may be acquired, and in second sampling mode, a periodic waveform modulation such as a sinewave, may be demodulated through the frequency mixing effect and integration on a storage capacitor, resulting in a phase measurement and thereby, a range estimate. In a third modulation case, two and perhaps three sinewaves of different frequencies are superimposed as a modulation signal on a semiconductor laser, and the received waveform output from input amplifier 172 is sampled by 2 or 3 unit cell sampling structures arranged in parallel, and operating at the 2 or 3 different frequencies of the modulation signal. Each frequency is demodulated and the phase measured by the unit cell sampling structure 183 tuned to the frequency of interest by feeding the appropriate sampling frequency from sample clock 186, typically a copy of the modulation frequency.

When measuring the phase of reflected laser energy with respect to a transmitted laser sinewave modulation, certain limits must be observed. If the ladar should have a maximum range capability of 150 meters in free space, the total round trip delay from transmit to receive would be around 1 microsecond. For the phase measurement to be meaningful, the frequency of transmission must therefore be less than 1 MHz to avoid spatial (distance) aliasing of targets at the 150 meter limit. In other words, the further the target, the lower the frequency of modulation must be for a single modulation frequency phase measurement to be meaningful. In a conventional sweep radar, the dwell time on the target is limited, so return signals beyond the maximum design range often do not appear as aliased, or "ghost" signals at a shorter apparent range. In the ladar of the instant invention, the typical mode is a staring mode, and there is no sweep of the illuminating beam or receiving antenna across the target space. Therefore, in the modular ladar sensor unit 29 or modular ladar sensor 14 of the present design, responses from targets beyond the designed maximum range could produce an aliased response (one in which the phase shift is greater than $2\pi$). A method for resolving these aliased, or "ghost" images is to illuminate the target in a second or third transmission with a slightly different frequency; for example 0.99 MHz versus the 1.0 MHz in a first gated sinewave illuminating pulse. If the target image remains at the same apparent range, it is likely a real target at a range less than the design maximum range limit. If the apparent range of the target shifts at the second illuminating frequency, it is likely the image is an aliased, or "ghost" image from a target at a distance beyond the design maximum range of the modular ladar sensor unit 29 or modular ladar sensor 14. The modular ladar senso unit 29 or modular ladar sensor 14 of the instant invention makes use of a frequency agile transmitter which can rapidly tune from a first transmission frequency to a second transmission frequency, and more if necessary. In one preferred embodiment, the unit cell sampling structure is doubled or tripled, and operated in parallel, and two or three sinewave modulation signals are superimposed on a semiconductor laser transmitter. When using multiple frequency modulation, the individual frequencies should not be simple harmonics of each other; i.e., they should not be related by fractions of low value integers. The modular ladar sensor unit 29 or modular ladar sensor 14 of the preferred embodiment may make use of a semiconductor laser, typically a VCSEL structure, enabling the use of shaped single pulses, shaped multiple pulses, shaped and encoded multiple pulses, gated sinewave, gated chirped sinewave, and multi-frequency gated sinewave modulation schemes. By selecting a modulation regime appropriate to the particular scene or objects to be imaged, the flexible modulation capabilities of the present design result in a minimum sized pulsed laser illuminating source with maximum performance in range and resolution.

Figure 8:
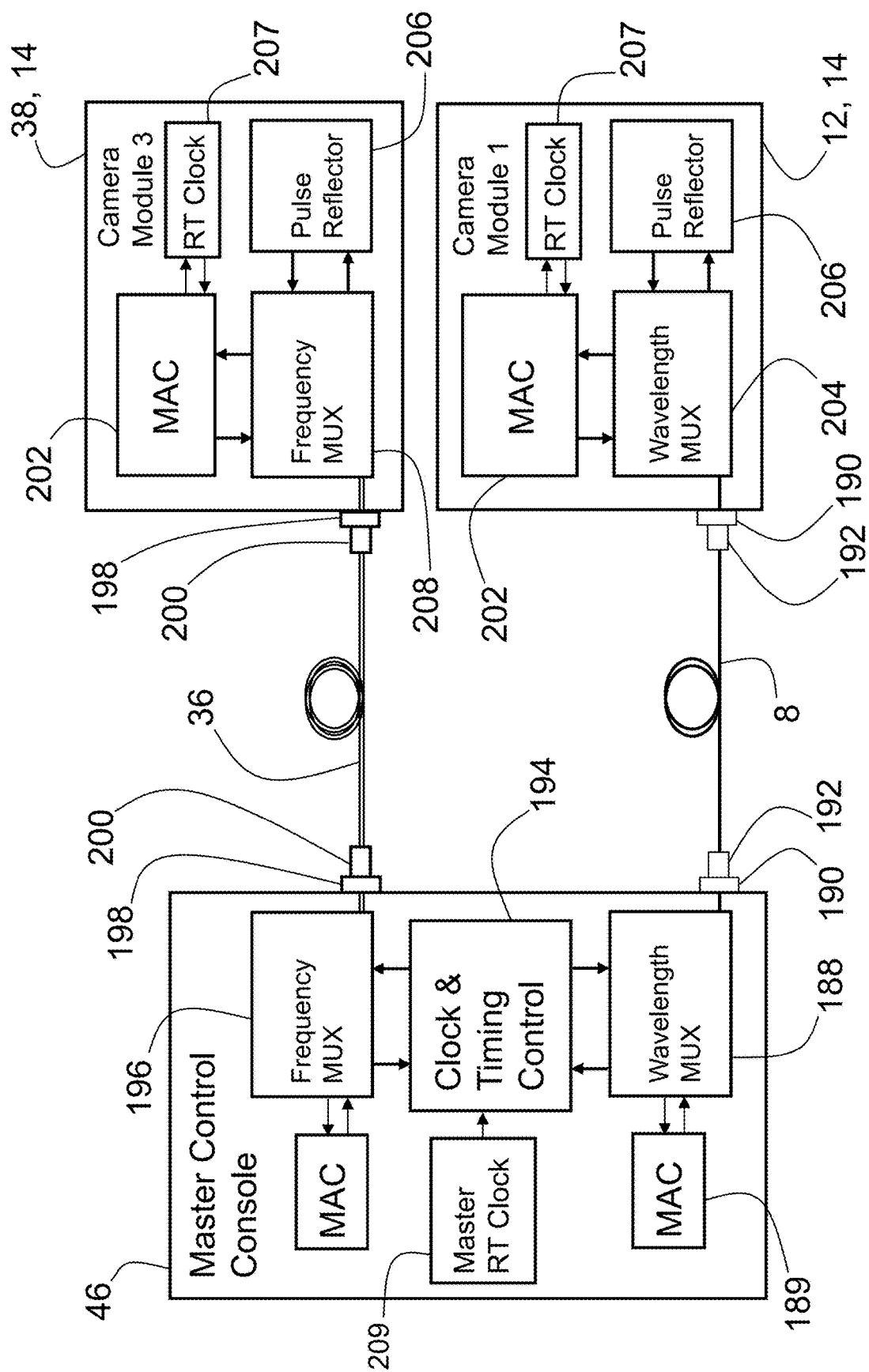
FIG. 8 shows a block diagram of the components of an optional cable length equalization system of a master controller operating within a video production bay for a 3-D video production setup employing multiple video cameras and ladar sensors, and pertaining to the application shown in FIGS. 1 and 2.

FIG. 8 illustrates a feature of the multi-camera production system as shown in FIGS. 1 and 2. In order to make sure the 3-D images returned from each modular ladar 14 or 29 are coincident in time with another 3-D image, each frame of video or still picture is time stamped by production video camera 12, 28, 32, or 38. For a moving target, it is important when synthesizing 3-D models of the scene in the field of view, to have the images taken at the same time. This time stamp reference information can come from a GPS receiver if one is embedded or attached to the individual camera 12, or it may be distributed locally over the connecting fiber optic cable 8, or electrical cable 36 or by local wireless transmission. In a GPS denied environment, or when lower cost cameras are being used without GPS antennas and receivers, master control console 46 may distribute a local time reference via the connecting fiber optic 8 and electrical cables 36, and may nullify the differences in cable length by several means. The master control console 46 has a clock and timing control 194, which may send out a command to camera module 1 (12) indicating a cable length measurement sequence is forthcoming, followed by an outbound timing pulse, with the pulse being applied to a small semiconductor laser at a first wavelength, 1300 nanometers. The outbound timing pulse, at a first wavelength of 1300 nanometers is coupled to fiber optic cable 8 by wavelength multiplexer 188. Fiber optic cable 8 has a male plug connector 192 at both ends, typically a SC, LC, FC, or ST type. Master control console 46 has a panel mounted female receptacle fiber optic connector 190 of the mating SC, LC, FC, or ST type which makes optical connections with the fiber optic cable 8. At the far end of fiber optic cable 8 camera module 1 (12) also has a panel mounted female receptacle connector 190 of the mating SC, LC, FC, or ST type. When the timing pulse from clock and timing control 194 is received by professional video camera 12, it is routed to Media Access Controller (MAC) 202 and to pulse reflector 206 by wavelength multiplexer 204. The timing pulse is wider than a conforming data pulse, and is ignored by the MAC, but is detected and reflected immediately by the pulse reflector 206. The reflected timing pulse is applied to a second semiconductor laser at a second wavelength of 1345 nanometers at the wavelength multiplexer 204 and sent back down the fiber optic cable 8. When the timing pulse is received back at the wavelength multiplexer 188 of the master control console, it is routed to clock and timing control circuit 194 which has an internal high speed digital counter timing the process, thus measuring the two-way electrical delay of the fiber optic cable 8. Once the cable electrical length is known, the master control console 46 uses this information to synchronize the real time clocks 207 in each camera module. The master control console polls a particular camera module 12 for the status of the real time clock 207, which request has the highest priority, and must be responded to immediately, and with a known delay. This response from the real time clock 207 should be the value of the master real time clock 209 plus the measured delay through the cable and the fixed electrical delays through the camera module which are known and recorded in the particular camera module. If the response from the real time clock 207 is not as expected, an error/adjustment value is sent from master control console 46 to the camera module 12, and the process repeated until the deviation/error is within acceptable bounds and periodically checked during the dead time between camera flashes. To create 3-D models accurate to a millimeter when the target may be a speeding bullet or cannon round travelling at 3000 fps, it is necessary to synchronize the real time clocks 207 of the several camera modules to less than 1 microsecond. All communications from master control console 46 to the several camera modules over fiber optic cables are transmitted on the first wavelength, 1300 nanometers, and image and status data received from the camera modules on a second wavelength at 1345 nanometers. Other wavelengths may be used with the same beneficial effects.

The same cable length measuring process and real-time clock adjustment can be performed on electrical cable 36. The master control console has a clock and timing control 194, which may send out a command to camera module 3 (38) indicating a cable length measurement sequence is forthcoming, followed by an outbound timing pulse, with the pulse being applied to a high frequency gated oscillator, producing a 2 gigahertz RF pulse. The outbound timing pulse, at a first frequency of 2 GHz is coupled to electrical cable 36 by frequency multiplexer 196. Electrical cable 36 has a male plug connector 200 at both ends, typically a BNC, RJ-45, TNC, HSSDC, DB-9 or other connector well suited to the particular cable type. Master control console 46 has a panel mounted female receptacle electrical connector 198 of the mating BNC, RJ-45, TNC, or DB-9 type which makes electrical connections with the electrical cable 36. Other cabling and connector types may be used without significantly altering the operation and benefits of the instant invention. At the far end of electrical cable 36 camera module 3 (38) also has a panel mounted female receptacle connector 198 of the mating BNC, RJ-45, TNC, or DB-9 type. When the timing pulse from clock and timing control 194 is received by professional video camera 38, it is routed to Media Access Controller (MAC) 202 and to pulse reflector 206 by frequency multiplexer 208. The timing pulse is wider than a conforming data pulse, and is ignored by the MAC, but is detected and reflected immediately by the pulse reflector 206. The reflected timing pulse is applied to a second high frequency gated oscillator at a second frequency of 250 MHz at the frequency multiplexer 208 and sent back down the electrical cable 36. When the timing pulse is received back at the frequency multiplexer 196 of the master control console, it is routed to clock and timing control circuit 194 which has an internal high speed digital counter timing the process, thus measuring the two-way electrical delay of the electrical cable 36. The master control console 46 then is able to synchronize the real time clock on camera module 3 (38) in the same manner as described with respect to camera module 1 (12), by polling the real time clock 207 of camera module 3 (38) and making error measurements and adjustments until the real time clock 207 error is within acceptable limits. All communications from master control console 46 to camera modules connected via electrical cables are transmitted on the first frequency, 2 Ghz, and image and status data received from the camera modules on a second frequency of 250 MHz. Other frequencies and electrical modulation schemes may be used with the same beneficial effects. An alternative signaling scheme may use time division multiplexing over one fiber with a first wavelength of $\lambda 1$ or electrical cable with frequency f1 used to handle two-way data communications and control, with handshaking controlled by the media access controller 186 resident on the master control console 46. The second wavelength $\lambda 2$ or frequency f2 may be used solely for the cable length measurement function. A third alternative signaling scheme makes use of time division multiplexing over one fiber with a first wavelength of $\lambda 1$ or electrical cable with frequency f1 used to handle two-way data communications and control, with handshaking controlled by the media access controller 189 resident on the master control console 46. No second wavelength $\lambda 2$ or frequency f2 is required. In this case, cable length measurement is managed by the use of special control codes or non-compliant data pulses which are recognized by the terminal end MACs 202. For instance, all data fields may be 8B/10B encoded, which encodes 256 data words into a space with 1024 possible combinations, leaving 768 codes available for special status reporting or control functions such as cable length measurement.

Shown in FIG. 9 is a bidirectional wavelength multiplexer of the type referenced in FIG. 8 as 188 and 204. An enclosure 210 is typically made of deep drawn or formed Covar®, a steel alloy with a thermal coefficient of expansion matched to the TCE of the glass seals 214 which electrically insulate beryllium copper or Covar® leads 212, and seal the package against the environment. An insulating substrate 216, typically alumina or aluminum nitride, is mounted to the inner surface of the enclosure 210 which has a metalized top surface 218 connected to a lead 212 via wirebond 220. Bonded to the top of insulating substrate 216 is detector diode 222, typically a gallium arsenide PIN structure. In operation, detector diode 222 receives light reflected from dichroic beamsplitter 232, which reflects light at a first wavelength $\lambda 1$, typically 1300 nm in the case of the wavelength multiplexer 204 embedded in the various camera modules 12, 38, etc. of the preferred embodiment, and passes other wavelengths only slightly attenuated. A precision receptacle sleeve 224 is welded to, or formed with enclosure 210, and a ferrule stop 230 formed integrally with enclosure 210, or welded thereto. Within sleeve 224 is bonded a short section of a precision cylindrical ferrule 228 with a centered bore containing a short section of polished optical fiber 226. The ferrule 228 and fiber 226 mate with a similar ferrule from the plug end of a mating fiber optic connector plug, when the tip of the mating connector ferrule is inserted into the sleeve 224. When properly mated, the ferrule 228 and polished optical fiber 226 receive and transmit optical signals bidirectionally along the axis of rotation of optical fiber 226. Detector diode 222 may be a PIN, APD, or photovoltaic converter producing a current or voltage in response to illumination by an optical signal of the proper wavelength. Dichroic beamsplitter 232 is held in place by epoxy and/or a retention feature of enclosure 210 which may be integrally formed or attached thereto. A vertical cavity surface emitting laser or surface emitting LED 234 is attached to a second substrate 216, and transmits optical signals at a second wavelength, $\lambda 2$ in response to a current or voltage applied through a second set of leads 212. The second wavelength $\lambda 2$ is typically 1345 nm, but may be any wavelength which differs enough from $\lambda 1$ to allow for a practical dichroic beamsplitter 232 to easily separate the two wavelengths of light. The assembly of FIG. 9 is commonly referred to as a "BIDI", or bidirectional communications module, and is commonly used in terrestrial fiber optic networks. At the source end embedded in master control console 46, the BIDI 188 may use beamsplitter 232 unaltered, and assembled in the exact same manner, except the positions of detector diode 222 and VCSEL or LED 234 must be reversed. In addition, the wavelength of VCSEL or LED 234 needs to be switched to $\lambda 1$ at the source end BIDI 188. Detector diode 222 is typically a broadband detector, sensitive over a broad range of wavelengths, including both $\lambda 1$ and $\lambda 2$, so it would normally not need replacing. Master control console 46 may have one source end BIDI 188 for each camera module served by fiber optic connections.

FIG. 10 is a diagram of the frequency multiplexer 196 referenced in FIG. 8. An input RF connector 236 makes connection to an input RF cable connector, and to a controlled impedance microstrip line 237. A coupled line segment 238 is typically one quarter wavelength in length and is used to direct the higher frequency f1, at 2 GHz in the preferred embodiment, to a bandpass filter 240 and an upper band output connector 246. The lower band frequency f2, typically at 250 MHz, is passed through to lower band output connector 244. The lower band output 244 may be filtered through a low pass or bandpass filter (not shown) before being connected to MAC 202 or pulse reflector 206 in the example of FIG. 8. The isolated port is terminated in a 50 ohm load 242 to ground. Other impedances may be used, and connectorless connections may be made at input/output ports, and other types of couplers, tuned filters, or transformer coupled lines may alternatively be used to the same effect without substantially altering the benefits of the invention. The structure is reversed at the source end to enable downlink communications at the second frequency, f2.

Figure 11:
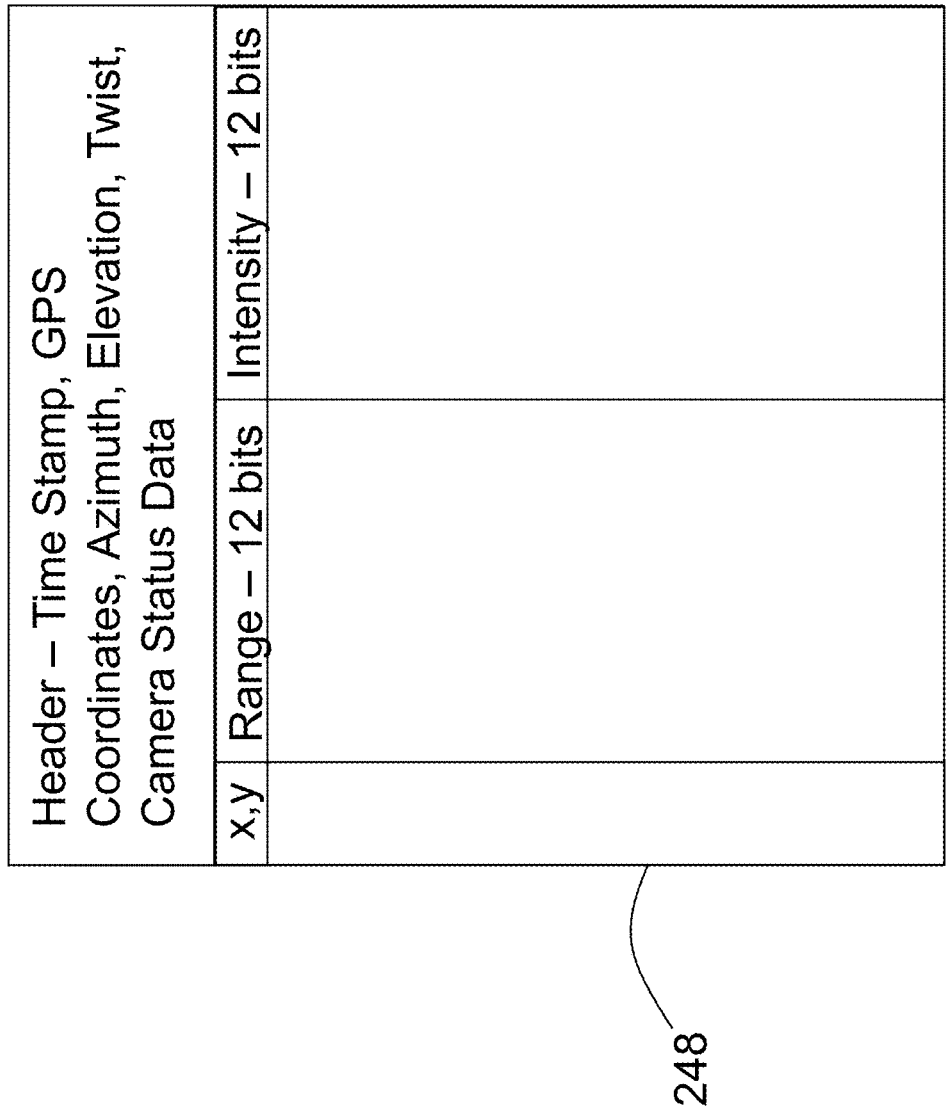
FIG. 11 is a diagram showing the arrangement of a file format incorporating essential elements useful in creating composite 3-D models from multiple ladar sensors, each with a 3-D image output.

FIG. 11 is a tabular representation of a file format 248 which may be used to facilitate multi-camera 3-D productions which allow for 3-D computer modeling of a solid object to be constructed with a minimum of difficulty. In the columns of the table are the (x,y) coordinates of the detector array, in this case x=1-128, and y=1-128. For each (x,y) coordinate pair, a 12 bit representation of range, and a 12 bit representation of intensity are stored. The range number is a counter output which may be adjusted for a number of system non-linearities, and/or offset errors, or may be output in raw form for diagnostic purposes, or for external data processing. The intensity number is the digital output of an analog-digital converter which may be corrected for system non-linearities and initial offsets, or may be output in raw form, suitable for diagnostic purposes and post processing. In the file header, a number of important parameters are recorded which are essential to rapidly reducing the data from multiple ladar sensors into a composite 3-D solid model of a scene and objects in the common field of view as pictured in FIG. 1. The file header includes a time stamp for the start of a scene capture sequence, typically the real time when the flash detector 123 transitions or the moment when the ARC signal pulses. If the camera module 12 or modular ladar sensor 14 or modular ladar sensor unit 29 is equipped with a GPS receiver, the GPS location coordinate references are also stored, or longitude, latitude, and elevation which have been provided by a surveyor's mark and careful measurement may alternatively be recorded. In addition, other elements comprising the "pose" of the camera are stored; the elevation angle (pitch), twist angle (roll), and azimuth (yaw). Azimuthal data may be recovered from shaft encoders which are attached to the horizontal pivot mount on camera module 12 or modular ladar sensor 14 or modular ladar sensor unit 29.

Figure 12:
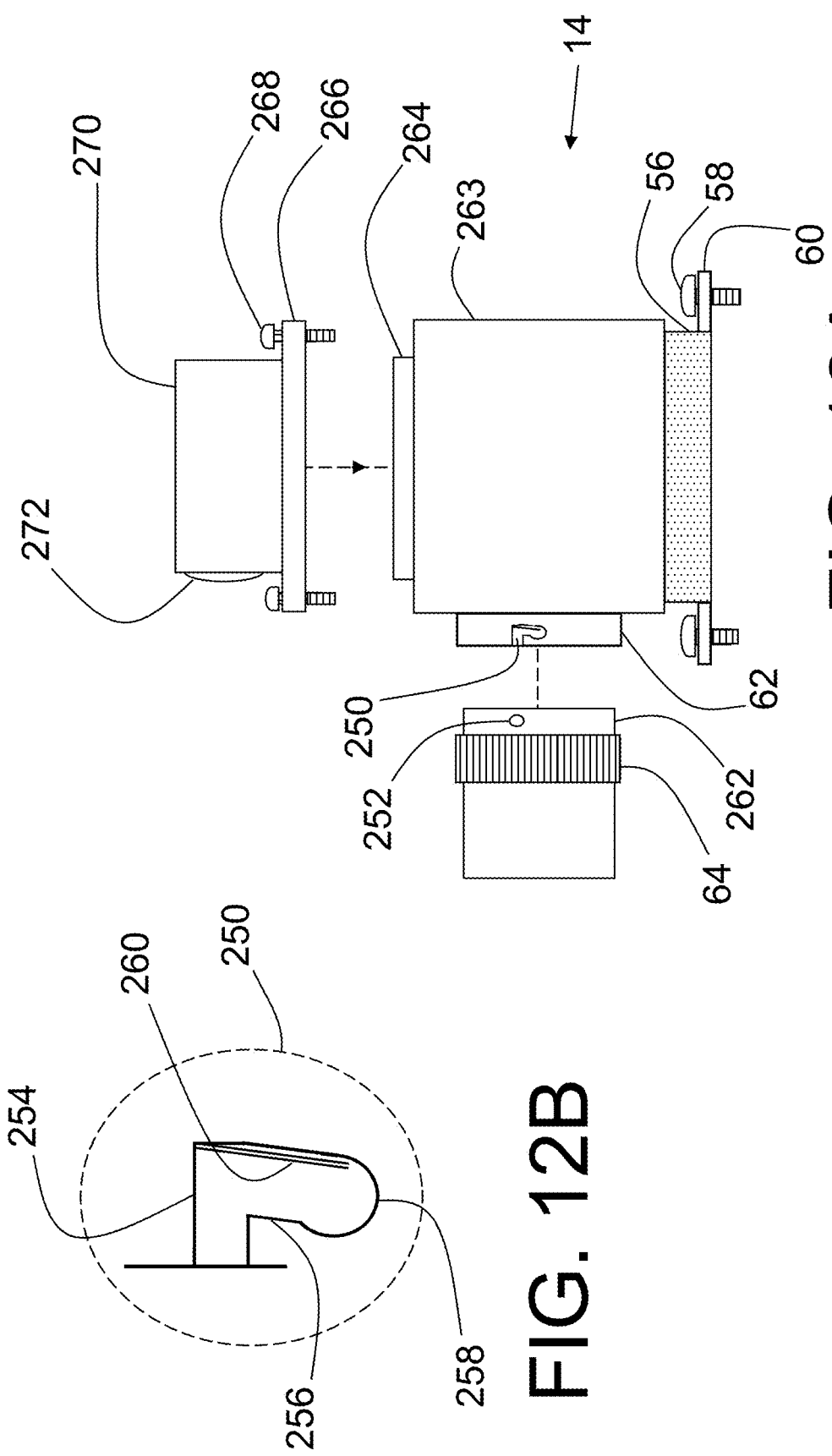
FIGS. 12A and 12B are a diagram showing the modular attachment of the optical subassembly and the laser transmitter subassembly to the receiver body of the modular ladar sensor and a detail view of the bayonet receptacle feature for a lens.

FIG. 12A is a diagram showing the structures which enable modular assembly of the components comprising the modular ladar sensor 14 which is also shown as an assembled unit in FIG. 4. A metallic shell 56 encloses a number of electrical contacts, and in some variants, optical connector components, and is typically part of a DB-25 male connector plug. Flange 60 provides a mechanical retention and mounting feature for the modular ladar sensor 14, and has clearance holes for screws 58. Screws 58 may be held within the mounting holes of flange 60 by small sheet metal clips (not shown). A bayonet style optical receiver coupling 62 is adapted to receive a bayonet style optical plug coupling 262 at the mating end of modular lens assembly 64. Bayonet style optical receiver coupling 62 has a bayonet receptacle feature 250 which is shown in detail in FIG. 12B. An insertion slot 254 connects to a ramped slot 256, which leads into a retention détente 258. Leaf spring 260 acts to urge button catch 252 forward into détente 258 once the modular lens assembly 64 is inserted and rotated into position. Button catch 258 is a short round column machined into the surface of the mating cylinder of optical plug coupling 262, or welded thereto. Modular lens assembly 64 is typically cylindrical, and may be of fixed focal length, or may alternatively be a zoom lens, and may have an internal shutter, and may have a motorized zoom drive. A laser transmitter module 270 is mounted to a simple header type electrical connector receptacle 264 protruding from the receiver module housing 263. The electrical connector receptacle 264 is typically a keyed connector, which may only be mated in one orientation. Receiver module housing 263 contains all the elements of the modular ladar sensor 14 except the light collecting and focusing lens assembly 64, and the laser transmitter 270. The receiver module housing 263 features electrical and mechanical interfaces to support quick connection of a modular lens assembly 64 as well as a laser transmitter module 270. Laser transmitter module 270 is secured to the body of receiver module 263 by four screws 268 mounted through clearance holes in flange 266. Within flange 266 is a recessed mating connector plug (not shown), and both receptacle 264 and the recessed mating connector plug within flange 266 may be provided with mating electrical contacts as well as mating optical connector contacts (not shown), and are typically keyed to ensure properly oriented mating. An optical transmission aperture and diffusing lens 272 may be a fixed type, or may be selectable, or continuously variable in field of view and focal length. One of the great advantages of the modular ladar sensor 14 construction consists in the ability to isolate the production yields of the laser transmitter module 270 assembly from the production yields of the receiver module 263. Another advantage of the modular construction is the rapid configurability; larger telephoto lens assemblies 64 with long focal lengths and narrow fields of view, can be rapidly interchanged with much smaller short focal length and wide field of view lens assemblies 64 near the end of the production line, or even in the field. Similar advantages accrue to the modular ladar sensor 14 in the use of a laser transmitter module 270, which may be a very powerful 4 milliJoule solid state optically pumped rod laser, or a much less powerful array of semiconductor lasers for shorter range applications.

Figure 13:
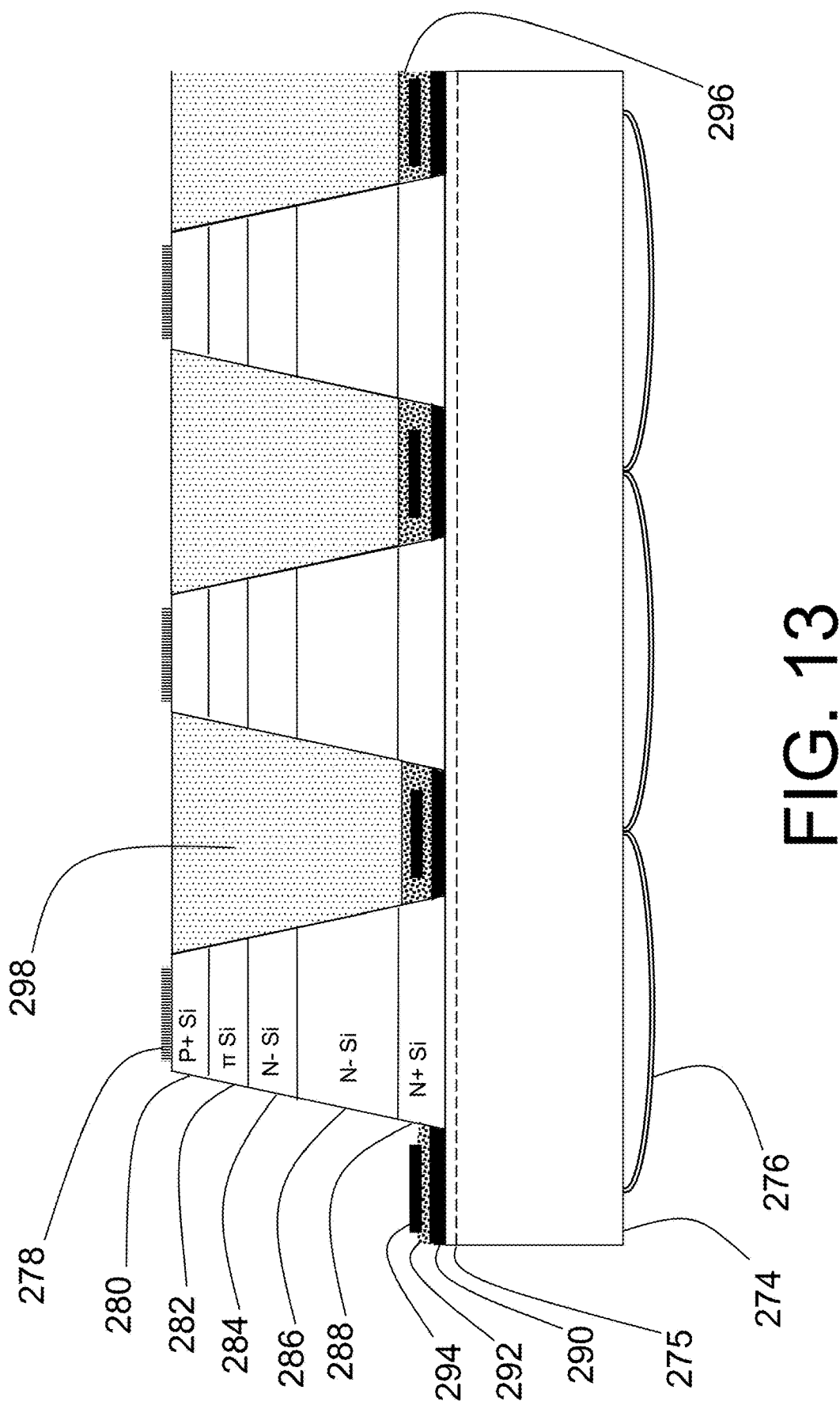
FIG. 13 shows the construction of an improved focal plane array of detectors realized as an array of avalanche photodetectors on a silicon-on-sapphire or gallium nitride-on-sapphire substrate which may be used in visible and near-IR applications of the modular ladar sensor.

FIG. 13 shows a cross-sectional view of a new type of detector array 130 which may be mated with a readout integrated circuit (ROIC) 132 as shown in FIG. 6. Of special interest in detector arrays of this type and size, is the inter-element isolation of the individual detector elements of the detector array 130. In the prior art flash ladar sensors described in earlier patent applications by Stettner, et. al., the detectors are avalanche photodiode (APD) or p-intrinsic-n (PIN) detectors formed in a thin gallium arsenide film atop a semi-insulating indium phosphide substrate. Because of the close proximity of the detector elements, which are typically spaced on a 40-100 micron pitch, and with individual detector elements having 30-75 micron active regions, in some cases only a 10-20 micron gap separates individual elements of the detector array 130. This level of intimacy between detector elements leads to inter-element coupling both optically and electrically through the connecting substrate and through capacitive effects. The new structure depicted in FIG. 13 addresses these issues by starting with an electrically insulating sapphire substrate 274. Lens elements 276 are formed over the active area of each element of the detector array 130 by wet or dry etching the prepared substrate 274 which has been coated with a photoresist and exposed to UV light. The lens elements may also be formed of a polymer material molded over the top of the sapphire substrate, though the substrate must be accurately registered within the mold to make sure the optical axes of both lens 276 and detector elements of detector array 130 are in line. Because the melting points of polymers suitable for lenses 276 are relatively low, the overmolding of lenses 276 would typically follow, rather than precede the formation of the active detector elements of detector array 130. In the preferred mode, lenses 276 are formed in sapphire by etching of the substrate 274, and a thin film of n+ or n++ silicon 288 grown atop sapphire substrate 274. N+ or n++ region 288 may also serve as precursor to an ohmic contact being formed. A somewhat thicker absorption layer of n− silicon 286 would then be epitaxially grown atop the cathode region formed by the n+ region 288. Next, an n− silicon layer 284 is grown epitaxially, which may function as an acceleration/multiplication region when the device is operated under applied voltage bias. A silicon intrinsic layer 282 is then grown epitaxially, which serves as an avalanche multiplication region for the device. Finally, a p+ or p++ silicon region 280 is grown, which serves as the device anode. Boron and aluminum may be used as dopants for any of the p-type silicon epitaxial layers. Phosphorus, arsenic, and antimony may be used as dopants for any of the n-type silicon epitaxial layers. Mesas are then formed in the device, typically at a 60 degree angle, by dry or wet etching, clear through the silicon, exposing the sapphire, and fully isolating each mesa structure. The sapphire acts as an etch stop, given the proper choice of etchant. Ohmic contacts 290 are then formed by deposition of titanium/platinum/gold, or other suitable metallization schedule, and in the troughs between mesas, and abutting the sides of an n+ or n++ region 288, making electrical contact to all of the cathodes of the individual detector elements of detector array 130. Anode contacts 278 are also deposited at the same time atop each mesa structure, with the titanium/platinum/gold metallization also being preferred. A thin dielectric layer 292 of silicon nitride is then deposited in the troughs between detector mesas, which acts as an insulating cap layer over cathode contacts 290, and also acts as a dielectric, creating localized capacitance when metallic ground contacts 294 are deposited. The cathode contacts 290 may be formed as an interconnected mesh pattern, with square openings for the mesa structures of the individual detector elements of detector array 130, which protrude therethrough. The ground contacts 294 may also form an overlying mesh pattern atop cathode contacts 290, and the combination of cathode contacts 290, ground contacts 294, and dielectric layer 292 may be termed a capacitive voltage distribution grid, because it is typically used to distribute the bias voltage to the individual detector elements of detector array 130. A second insulating/cap layer 296 of silicon nitride is then deposited selectively, passivating the metallization layers and portions of the silicon epitaxial regions. Because silicon avalanche photodiodes typically have secondary emission of photons, the isolation between individual detector elements of detector array 130 is not assured. For this reason, a photon absorbing buffer region 298 is deposited in the gaps between detector mesas, and in the preferred embodiment, a polymer loaded with very fine carbon particles. These carbon particles may be very fine submicron carbon particles. In some designs, a thin layer of crystalline aluminum nitride (AlN) 275 may be grown atop sapphire substrate 274 before further growth of silicon layers 288, etc. The thin layer of AlN 275 may prove beneficial as an optical index matching layer, serving to reduce optical reflections at the sapphire-silicon interface. Other insulating substrate materials may be used, but sapphire is well matched to silicon for single crystal epitaxial growth, desirable for the detector elements of detector array 130. Other metallization schemes may be used, though the titanium/platinum/gold is preferred. Materials other than carbon may also be used as a photon absorbing buffer, without any significant changes to the benefits of the described device. The choice of silicon as a detector material would imply a shift in illuminating wavelength to a range between 400-1100 nanometers, and this may be desirable in certain applications, and may be accommodated by a solid state Nd:YAG laser at 1064 nm or a semiconductor laser of InGaAsP at any wavelength between 780-1000 nm.

In order to function as a photodetector at the preferred wavelength of 1.57 microns, the structure of FIG. 13 may be adapted to use gallium nitride or indium gallium nitride as a replacement for silicon in any of the five semiconductor layers of the mesa structures shown in FIG. 13. Gallium nitride is also a good match for sapphire substrates with the proper crystal plane orientation. GaN on sapphire is commonly used to create high brightness blue and UV lasers and LEDS in volume for Blu-Ray® disc players, and lighting, respectively. The steps to construct the an APD device from GaN would be the same as those described with respect to the silicon APD structure of FIG. 13, except substituting GaN for silicon in each epitaxial growth. Silicon and germanium may be used as dopants for any of the n-type GaN layers. In some cases, magnesium may be used as a dopant for any of the p-type layers in GaN. The photon absorbing buffer layer 298 is not necessary, and may also be eliminated, since the material would be GaN, which does not exhibit a secondary photon emission phenomenon.

Figure 14:
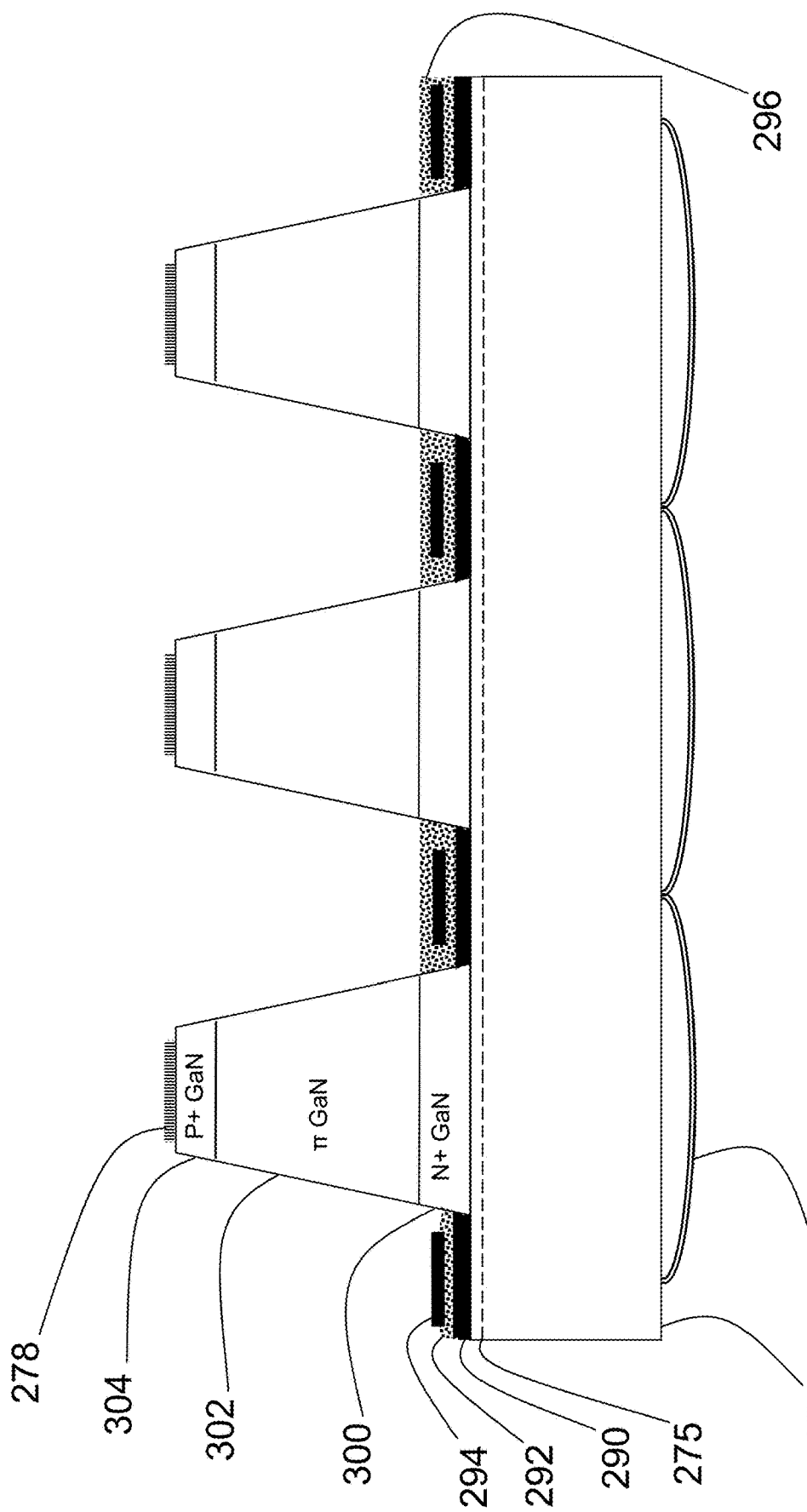
FIG. 14 shows the construction of an improved focal plane array of detectors realized as an array of PIN photodetectors on a silicon-on-sapphire or gallium nitride-on-sapphire substrate which may be used in visible and near-IR applications of the modular ladar sensor.

FIG. 14 shows a cross section view of a p-intrinsic-n (PIN) detector array 130 created from a GaN on sapphire wafer. The structure is the same and the processing similar to the processing as described with respect to FIG. 13, except the two n− layers 286 and 284 are eliminated, and the photon absorbing buffer layer 298 is not necessary since the material is GaN, which does not exhibit a secondary photon emission phenomenon. Instead, the n+ cathode 300 is grown from gallium nitride, the intrinsic layer 302 is GaN, and the p+ anode 304 is grown from GaN as well. In some designs, a thin layer of lattice-matched crystalline aluminum nitride (AlN) 275 may be grown atop the sapphire substrate 274 before further growth of GaN layers 300, etc. The thin layer of AlN 275 may prove beneficial as an optical index matching layer, serving to reduce optical reflections at the sapphire-gallium nitride interface. The PIN detector structure of FIG. 14 offers somewhat better uniformities in individual detector characteristics across the detector array 130 (albeit at less than unity gain), lower processing complexity, and better yields, and therefore is preferable in some applications where the superior performance of an APD is not required. Two detector structures for a detector array 130, one with PIN detectors, and the other with APD detectors, are shown in FIGS. 13 and 14, which are formed on an insulating sapphire substrate, isolated via an etch back to the supporting sapphire substrate, and may be made from either silicon or GaN, and which have a capacitive voltage distribution grid, to further reduce the degree of inter-element coupling.

FIG. 15 is a diagram showing the mating of detector array 130 with readout IC 132. Row amplifiers 306 and column amplifiers 314 allow the output from a unit cell electrical circuit 308 to be output as part of a row output or column output read cycle. All signals to and from readout IC 132 are communicated through bond pads 312 at the periphery of the ROIC 132. Atop each unit cell electrical circuit 308 is an indium bump 310 which is compressed and deformed under temperature and pressure as part of the bonding process which mates detector array 130 to readout IC 132. The indium bump 310 may instead be a low temperature solder bump, which may be reflowed to permanently bond detector array 130 to readout IC 132. The arrow shows the direction of mating, and the top of detector array 130 shows the grid pattern of a microlens array comprised of lens elements 276 which collect and focus light into each of the individual detector elements of detector array 130 formed on the anterior surface.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

The invention claimed is:

1. A mobile ladar platform comprising:
a first electrically conductive housing having an interior wall;
a ladar sensor mounted to said interior wall of said first electrically conductive housing;
a first connector mounted to said first electrically conductive housing and electrically connected to said ladar sensor;
a cable extending between a first end and a second end;
a second connector disposed at said second end of said cable and adapted to mate with said first connector;
a third connector disposed at said first end of said cable;
a second electrically conductive enclosure;
a digital processor disposed within said second electrically conductive enclosure; and
a fourth connector coupled to said second electrically conductive enclosure and coupled to said digital processor;
said third connector connected to said fourth connector such that said cable connects said ladar sensor to said digital processor;
said digital processor adapted to perform analysis of a scene in a field of view of said ladar sensor;
said ladar sensor further comprising
a laser transmitter with a modulated laser light output and a diffusing optic for illuminating a scene in the field of view,
a zero range reference circuit having a zero range reference output adapted to signal the initiation of said modulated laser light output,
a clock driver circuit having a clock output and having a temperature stabilized frequency reference,
a two-dimensional array of light sensitive detectors positioned at a focal plane of a light collecting and focusing system, each of said light sensitive detectors having an output producing an electrical response signal from a reflected portion of said modulated laser light output,
a readout integrated circuit with a plurality of unit cell electrical circuits, each of said unit cell electrical circuits having
an input connected to one of said light sensitive detector outputs,
an electrical response signal demodulator, and
a range measuring circuit connected to an output of said electrical response signal demodulator,
said range measuring circuit further connected to said zero range reference output and to the clock output and having a range output,
said two-dimensional array of light sensitive detectors electrically connected to said readout integrated circuit through a plurality of metallic bumps, and
a communications port having an input connected to the range output of each unit cell and adapted to transmit the range output of each unit cell through said first electrical connector and said second connector.

2. The mobile ladar platform of claim 1 wherein said digital processor is adapted to identify an object in the field of view and command a positioning system to maneuver said mobile ladar platform relative to the object.

3. The mobile ladar platform of claim 1 wherein said laser transmitter comprises an optically pumped solid state laser formed in a gain medium selected from the set of yttrium aluminum garnet, erbium doped glass, neodymium doped yttrium aluminum garnet, and erbium doped yttrium aluminum garnet.

4. The mobile ladar platform of claim 1 wherein said laser transmitter comprises a semiconductor laser formed in a semiconducting gain medium with at least one element selected from the set of indium, gallium, arsenic, phosphorus.

5. The mobile ladar platform of claim 1 wherein said modulated laser light output is modulated with a waveform selected from the set of a single Gaussian pulse profile, multiple Gaussian profile pulses, a single flat-topped pulse profile, multiple flat-topped pulses, a pulsed sinewave, and a chirped sinewave pulse.

6. The mobile ladar platform of claim 1 wherein the two-dimensional array of light sensitive detectors is mounted directly to the readout integrated circuit.

7. The mobile ladar platform of claim 1 wherein said two-dimensional array of light sensitive detectors is formed of a semiconductor having at least one element selected from the set of silicon, indium, gallium, arsenic, phosphorus, aluminum, boron, antimony, magnesium, germanium, and nitrogen.

8. The mobile ladar platform of claim 1 wherein the cable has at least one fiber optic waveguide therein, and said first connector has at least one fiber optic contact.

9. The mobile ladar platform of claim 1 wherein the cable has at least one electrically conductive wire therein, and said first connector has at least one electrically conductive contact.

10. A wheeled vehicle comprising:
a first electrically conductive housing having an interior wall;
a ladar sensor having a field of view and mounted to said interior wall of said first electrically conductive housing;
a first connector mounted to said first electrically conductive housing and electrically connected to said ladar sensor;
a cable extending between a first end and a second end;

a second connector disposed at said second end of said cable and adapted to mate with said first connector;
a third connector disposed at said first end of said cable;
a second electrically conductive enclosure;
a digital processor disposed within said second electrically conductive enclosure; and
a fourth connector coupled to said second electrically conductive enclosure and coupled to said digital processor;
said third connector connected to said fourth connector such that said cable connects said ladar sensor to said digital processor;
said digital processor adapted to perform analysis of a scene in the field of view of said ladar sensor;
said ladar sensor further comprising
a laser transmitter with a modulated laser light output and a diffusing optic adapted to illuminate a scene in a field of view of the ladar sensor module,
a zero range reference circuit having a zero range reference output adapted to signal the initiation of the modulated laser light output,
a clock driver circuit having a clock output and having a temperature stabilized frequency reference,
a two-dimensional array of light sensitive detectors positioned at a focal plane of a light collecting and focusing system, each of said light sensitive detectors with an output producing an electrical response signal from a reflected portion of said modulated laser light output, and
a readout integrated circuit with a plurality of unit cell electrical circuits, each of said unit cell electrical circuits having
an input connected to one of the light sensitive detector outputs,
an electrical response signal demodulator, and
a range measuring circuit connected to an output of the electrical response signal demodulator, said range measuring circuit further connected to said zero range reference output and to said clock output and having a range output;
said two-dimensional array of light sensitive detectors electrically connected to said readout integrated circuit through a plurality of metallic bumps.

11. The wheeled vehicle of claim 10 wherein said laser transmitter comprises an optically pumped solid state laser formed in a gain medium selected from the set of yttrium aluminum garnet, erbium doped glass, neodymium doped yttrium aluminum garnet, and erbium doped yttrium aluminum garnet.

12. The wheeled vehicle of claim 10 wherein said laser transmitter comprises a semiconductor laser formed in a semiconducting gain medium with at least one element selected from the set of indium, gallium, arsenic, phosphorus.

13. The wheeled vehicle of claim 10 wherein the modulated laser light output is modulated with a waveform selected from the set of a single Gaussian pulse profile, multiple Gaussian profile pulses, a single flat-topped pulse profile, multiple flat-topped pulses, a pulsed sinewave, and a chirped sinewave pulse.

14. The wheeled vehicle of claim 10 wherein said two-dimensional array of light sensitive detectors is mounted directly to said readout integrated circuit.

15. The wheeled vehicle of claim 10 wherein said cable has at least one fiber optic waveguide therein and said first connector has at least one fiber optic contact.

16. The wheeled vehicle of claim 10 wherein said cable has at least one electrically conductive wire therein and said first connector has at least one electrical contact.

17. A motor vehicle comprising:
an electrically conductive housing having an interior wall;
a ladar sensor having a field of view and mounted to said interior wall of said electrically conductive housing; and
a digital processor connected to said ladar sensor through a cable;
said digital processor adapted to perform analysis of a scene in the field of view, to identify an object within said scene, and to command a positioning system to maneuver with respect to the object;
said ladar sensor further comprising
a laser transmitter with modulated laser light output and a diffusing optic for illuminating a scene in the field of view,
a zero range reference circuit having a zero range reference output adapted to signal the initiation of the modulated laser light output,
a clock driver circuit having a clock output, and having a temperature stabilized frequency reference,
an array of light sensitive detectors positioned at a focal plane of a light collecting and focusing system, each of said light sensitive detectors having an output producing an electrical response signal from a reflected portion of the modulated laser light output,
a readout integrated circuit with a plurality of unit cell electrical circuits, each of said unit cell electrical circuits having
an input connected to one of said light sensitive detector outputs,
an electrical response signal demodulator, and
a range measuring circuit connected to an output of said electrical response signal demodulator, and said range measuring circuit further connected to said zero range reference output, and said range measuring circuit connected to the clock output and having a range output;
said two dimensional array of light sensitive detectors electrically connected to said readout integrated circuit through a plurality of metallic bumps; and
a communications port having an input connected to the range output of each unit cell and adapted to transmit the range output of each unit cell through said cable to said digital processor.

18. The motor vehicle of claim 17 wherein the motor vehicle is selected from the set of a van and a truck.

19. The motor vehicle of claim 17 wherein said digital processor connects through a plurality of cables to a plurality of ladar sensors.

20. The motor vehicle of claim 17 wherein said digital processor also connects to at least one 2D video camera.

* * * * *